(12) United States Patent
Nilsson

(10) Patent No.: US 8,326,329 B2
(45) Date of Patent: Dec. 4, 2012

(54) METHOD FOR LOCALIZATION OF NODES BY USING PARTIAL ORDER OF THE NODES

(75) Inventor: Martin Nilsson, Sundbyberg (SE)

(73) Assignee: SICS, Swedish Institute of Computer Science AB, Kista (SE)

(*) Notice: Subject to any disclaimer, the term of this patent is extended or adjusted under 35 U.S.C. 154(b) by 167 days.

(21) Appl. No.: 12/934,227

(22) PCT Filed: Mar. 27, 2009

(86) PCT No.: PCT/SE2009/050326
§ 371 (c)(1),
(2), (4) Date: Jan. 14, 2011

(87) PCT Pub. No.: WO2009/120146
PCT Pub. Date: Oct. 1, 2009

(65) Prior Publication Data
US 2011/0105161 A1    May 5, 2011

(30) Foreign Application Priority Data
Mar. 27, 2008    (SE) .................................. 0800688

(51) Int. Cl.
*H04W 24/00* (2009.01)
(52) U.S. Cl. ............... 455/456.5; 455/456.1; 455/456.3; 455/456.6; 455/41.2; 455/507; 455/513; 455/514; 455/517; 455/67.11; 455/67.15; 709/223; 709/224; 342/450; 342/451; 342/463
(58) Field of Classification Search .... 455/456.1–456.6, 455/457, 41.2, 500, 502, 507, 512–514, 517–519, 455/67.11, 67.15; 709/223–224; 342/450, 342/451, 452, 458, 463
See application file for complete search history.

(56) References Cited

U.S. PATENT DOCUMENTS

| | | |
|---|---|---|
| 6,266,014 B1 | 7/2001 | Fattouche et al. |
| 6,407,703 B1 | 6/2002 | Minter et al. |
| 6,618,690 B1 | 9/2003 | Syrjärinne |

(Continued)

FOREIGN PATENT DOCUMENTS

EP    1 617 601 A2    1/2006

(Continued)

OTHER PUBLICATIONS

Peralta, Laura M. Rodriguez et al., "Collaborative Localization in Wireless Sensor Networks," Sensor Technologies and Applications, 2007. SensorComm 2007. Intl. Conf. on Sensor Technologies and Applications, pp. 94-100, Oct. 14-20, 2007; Section III-C.

(Continued)

*Primary Examiner* — Tuan A Tran
(74) *Attorney, Agent, or Firm* — Drinker Biddle & Reath LLP

(57) ABSTRACT

The present invention relates to a new method for localization, i.e. finding positions and orientations of nodes communicating in wireless networks. The method is based on using directional information (angle-of-arrival, AOA), and optionally distance information, combined with estimation by recursive filters such as e.g., Kalman filters, recursive least squares filters, Bayesian filters, or particle filters. The method expresses the localization problem as set of linear equations and ensures stability and convergence by imposing a partial order on the nodes.

19 Claims, 13 Drawing Sheets

U.S. PATENT DOCUMENTS

| | | | |
|---|---|---|---|
| 7,020,476 B2 * | 3/2006 | Day et al. | 455/456.5 |
| 7,289,466 B2 * | 10/2007 | Kore et al. | 370/328 |
| 7,313,403 B2 * | 12/2007 | Gong et al. | 455/456.1 |
| 7,353,031 B2 * | 4/2008 | Shi et al. | 455/456.1 |
| 7,558,583 B2 * | 7/2009 | Ledeczi et al. | 455/456.1 |
| 7,603,129 B2 * | 10/2009 | Gonia et al. | 455/456.1 |
| 8,150,378 B2 * | 4/2012 | Strutt et al. | 455/414.2 |
| 2005/0032531 A1 * | 2/2005 | Gong et al. | 455/456.5 |
| 2005/0233748 A1 * | 10/2005 | Robinson et al. | 455/440 |
| 2006/0215624 A1 | 9/2006 | Adya et al. | |
| 2007/0005292 A1 | 1/2007 | Jin | |
| 2007/0042706 A1 * | 2/2007 | Ledeczi et al. | 455/3.01 |
| 2007/0060098 A1 | 3/2007 | McCoy | |
| 2007/0076638 A1 * | 4/2007 | Kore et al. | 370/310 |
| 2007/0077941 A1 * | 4/2007 | Gonia et al. | 455/456.1 |
| 2007/0180918 A1 | 8/2007 | Bahr et al. | |
| 2007/0287473 A1 * | 12/2007 | Dupray | 455/456.1 |
| 2008/0209521 A1 * | 8/2008 | Malaney | 726/4 |
| 2009/0170526 A1 * | 7/2009 | Strutt et al. | 455/456.1 |

FOREIGN PATENT DOCUMENTS

| | | |
|---|---|---|
| WO | 2005/119293 A1 | 12/2005 |
| WO | 2006/002458 A1 | 1/2006 |

OTHER PUBLICATIONS

Hongyang, Chen et al., "A Robust Location Algorithm With Biased Extended Kalman Filtering of TDOA Data for Wireless Sensor Networks," Wireless Communications, Networking and Mobile Computing, 2005, International Conf. on vol. 2, pp. 883-886. Sep. 23-26, 2005; Section III.

Taylor, Christopher J., "Simultaneous Localization and Tracking in Wireles Ad-Hoc Sensor Networks," Computer Science and Artificial Intelligence Laboratory Technical Report, MIT-CSAIL-TR-2005-037, May 31, 2005, pp. 1-69; Chapter 3.

Nilsson, Martin, "Localization Using Directional Antennas and Recursive Estimation," Proceedings of the $5^{th}$ Workshop on Positioning, Navigation and Communication 2008 (WPNC'08), pp. 213-217, whole document.

Ash, Joshua N. et al., "Sensor Network Localization via Received Signal Strength Measurements with Directional Antennas," Proc. 42nd Annual Allerton Conference on Communication, Control, and Computing, Sep. 2004, pp. 1861-1870.

Ash, Joshua N. et al., "Robust System Multiangulation Using Subspace Methods," Proc. Information Processing in Sensor Networks, Apr. 2007, pp. 61-68.

Krumm, J., "Probabilistic Inferencing for Location," 2003 Workshop on Location-Aware Computing (Part of UbiComp 2003), Seattle, WA, Oct. 12, 2003, 4 pgs.

* cited by examiner

METHOD FOR LOCALIZATION OF NODES BY USING PARTIAL ORDER OF THE NODES

CROSS REFERENCE TO RELATED APPLICATIONS

This application is the National Stage of International Application No. PCT/SE2009/050326, filed 27 Mar. 2009, and claims benefit of SE Application No. 0800688-4, filed 27 Mar. 2008.

FIELD OF THE INVENTION

The present invention relates, in a first aspect, to a system operable to localize nodes communicating in a wireless network.

According to a second aspect, the present invention relates to a method for localization of nodes communicating in a wireless network.

According to a third aspect, the present invention relates to at least one computer program product for localization of nodes communicating in a wireless network.

BACKGROUND OF THE INVENTION

The document "Sensor Network Localization via Received Signal Strength Measurements with Directional Antennas", by Joshua N. Ash and Lee C. Potter, Dept. of Electrical and Computer Engineering, The Ohio State University, 2015 Neil Avenue, Columbus, Ohio 43210, relates to the self-localization that can be obtained using received signal strength (RSS) measurements from arrays of directional antennas on each sensor node. The Cramé r-Rao lower bound on location error variance is used to predict performance for efficient estimators and can inform design trade-offs for antennas, communication protocols, and estimation algorithms.

The document"Robust System Multiangulation Using Subspace Methods", by Joshua N. Ash and Lee C. Potter, Department of Electrical and Computer Engineering, Ohio State University Columbus, Ohio 43210, relates to a robust and low-complexity algorithm to self-localize and orient sensors in a network based on angle-of-arrival (AOA) information.

The document J. Krumm: "Probabilistic Interferencing for Location", Workshop on Location Aware Computing (Part of UlbiComp 2003), Oct. 12, 2003, Seattle, Wash., USA, describes and discusses various general techniques that researchers have adopted for processing sensor readings into location measurements, emphasizing probabilistic approaches. The described general techniques are deterministic function inversion, maximum likelihood estimate, MAP (maximum a posteriori) estimate, and three recursive filtering techniques: Kalman filter, hidden Markov model, and particle filter.

The Kalman filter assumes that the relationship between the measurement vector z and state vector x is linear with zero-mean, additive, Gaussian noise. It also assumes the previous state $x_{t-1}$ and current state $x_t$ is linear with zero-mean, additive, Gaussian noice.

The patent document WO-2005/119293 A1 relates to a method for determining positional data of at least one node (K1) of a network, said method comprising a number of nodes (K1, ..., Kn), whereby the positional data refers to an internal coordinate system. The method comprises the following steps: a) preparation of positional data for a subset (u) of nodes (K3, ..., K6), b) determination of separation data (D1-3, ..., D1-6) for the at least one node (K1), c) determination or, on repetition of step c), correction of the positional data for the at least one node (K1), depending on the positional data from step a), the separation data determined in step b) and positional data of the at least one node and d) repetition of steps a) to c), until an interruption condition is fulfilled.

The patent document WO-2006/002458 A1 relates inter alia to a method of providing enabled security services in a wireless network. The method comprises the steps of: receiving a network access request from a node requesting access to the wireless network; calculating a probability level for a position for the requesting node using position information claimed by the requesting node and position information about the requesting node derived from signal measurements for the requesting node received by at least one existing authorised node in the wireless network; and denying access for the requesting node to the wireless network if the probability level does not satisfy a specified threshold condition for network security. The position information claimed by the requesting node, the position information about the requesting node derived from signal measurements, or both, may comprise manually specified data for the respective node. The signal measurements may comprise received signal strength (RSS) measurements, time of arrival (TOA) measurements, time difference of arrival (TDOA), or angle of arrival (AOA) measurements.

The patent document U.S. Pat. No. 6,407,703 relates to a method for determining the geolocation of an emitter using sensors located at a single or multiple platforms. Generally, the method includes the steps of receiving a first measurement set relative to a first emitter, the first measurement set including angle of arrival, time difference of arrival and/or terrain height/altitude measurements, receiving a first location guess or estimate for the first emitter, and determining at least a second location estimate using at least one of a batch least squares analysis and a Kalman filter analysis.

The patent document US-2007/0180918 A1 relates to a self-organizing sensor network, wherein a number of sensor nodes organized themselves and include sensor elements, distance measuring elements and communication elements. The sensor network is able to locate individual, in particular mobile, sensor nodes. Each sensor node 1 includes inter alia a central processing unit 4, a communication means 5, and a distance measurement means 6. The distance measurement means 6 in the form of the radar module perform measurements to determine the distance to adjacent sensor nodes. By exchanging estimated positions via the communication means 5 and using suitable filtering and/or learning methods, such as a Kalman filter for example, the sensors can establish their location in an internal coordinate system.

The patent document US-2007/0060098 A1 relates to a radio frequency (RF) system and method for determining the location of a wireless node in a wireless mesh sensor network. The wireless network includes a plurality of wireless nodes linked to a digital computer, such as a server or a location processor, via a communications link. The method further comprises measuring the RF signal strength at the wireless nodes and/or differential time of arrivals of the received signals at the wireless nodes and/or the angle of arrival of the received signals at the wireless nodes. When RF signal strength and DTOA measurements can be utilized and the results of each can be optimally combined using least mean square (LMS), or Kalman, estimators to minimize any errors in the final calculated locations.

The patent document US-2007/0076638 A1 relates to efforts to determine the location of devices within a wireless network. An example system includes a wireless device that generates at least one pulse as a part of an output signal, and the at least one pulse is captured by anchor devices and used, in a time of arrival approach, to determine the location of the example device. Another example system includes an anchor node that generates a directional output signal, the direction output signal including data indicating its direction, and the directions of output signals from plural anchor nodes when pointed at a wireless device are used to determine the location of the wireless device. Combinations of the pulse and directional antenna systems, devices used within each of these systems, and approaches associated with these systems are also included.

The patent document US-2006/0215624 A1 relates to communications between network nodes on connected computer networks. Disclosed is a Neighbor Location Discovery Protocol (NLDP) that determines the relative locations of the nodes in a mesh network. NLDP can be implemented for an ad-hoc wireless network where the nodes are equipped with directional antennas and are not able to use GPS. While NLDP relies on nodes having at least two RF transceivers, it offers significant advantages over previously proposed protocols that employ only one RF transceiver. In NLDP antenna hardware is simple, easy to implement, and readily available. NLDP exploits the host node's ability to operate simultaneously over non-overlapping channels to quickly converge on the neighbour's location. NLDP is limited by the range of the control channel, which operates in an omni-directional fashion. However, by choosing a low frequency band, high power and low data rate, the range of the control channel can be increased to match the range on the data channel.

The patent document U.S. Pat. No. 6,618,690 relates to any system that estimates one or another aspect of the motion of an object, such as position. More particularly, the document pertains to the application of statistical filters, such as a Kalman filter, in such generalized positioning systems. The generalized positioning system uses a calculated association probability for each measurement in a set of measurements of positions (or other aspect of the motion) at a particular instant of time, the association probabilities being used in the calculation of a combined measurement innovation (residual), which is in turn used in calculating the next estimate of position (or other motion state information).

Some disadvantages with the above mentioned solutions are that they require centralized computation, are not robust against heavy noise in measurements, and convergence is not guaranteed.

SUMMARY OF THE INVENTION

The above mentioned problems are solved by a system operable to localize nodes communicating in a wireless network according to Claim 1. Each node comprises a partial ordering means operable to initially classify its node as an anchor node (A) if a measure of uncertainty of the state estimate, such as a state estimate error covariance norm, is below a first threshold value, or classify its node as a non-anchor node, giving rise to a partial order of said nodes. Each node also comprises a control means connected to the partial ordering means, and a recursive filter means connected to the control means. Every time a node (X) receives a message from another node, the control means is operable to check that the other node precedes the node (X) in the partial order. The recursive filter means is operable to be applied on the current state and measurement, giving an updated state. The partial ordering means is operable to update the status of the node (X) in the partial order. Each control means is operable to repeat the above, giving the position and orientation of each node.

A lot of advantages with the system according to the present invention are listed further on in the description.

A further advantage in this context is achieved if said control means for each node is operable to find said position and orientation sequentially.

According to another embodiment it is an advantage if said control means for each node is operable to find said position and orientation partially of fully in parallel. Furthermore, it is an advantage in this context if each recursive filter means is recursive least square filter of weighted recursive least square filter.

According to another embodiment it is an advantage if each recursive filter means is a Kalman filter A further advantage in this context is achieved if said partial ordering means is operable to assign an initially classified anchor node (A) a minimum fixed rank, wherein rank refers to an entity obeying a total order, wherein an anchor node (A) always precedes a non-anchor node in said partial order.

Furthermore it is an advantage in this context if said partial ordering means of non-anchor node (X) that receives and uses data from a set of nodes assign said non-anchor node (X) a rank which is higher than the highest rank of said set of nodes. A further advantage in this context is achieved if said partial ordering means is operable to reclassify a non-anchor node (X) as an anchor node (A) during updating if said measure of uncertainty of the state estimate is below said first threshold value, and its current rank is frozen.

Furthermore, it is an advantage is this context if each node also comprises a to said control means connected memory means operable to store estimated angle of arrival (AOA) by a node (X) from every neighbour node, error (variance) of AOA estimate, estimated orientation of node (X), error (variance) of orientation estimate, estimated position, and error (variance) of position estimate. The above mentioned problems are also solved with a method for localization of nodes communicating in a wireless network according to Claim 10. The method comprises the steps:

to initially classify a node as an anchor node (A) if a measure of uncertainty of the state estimate, such as a state estimate error covariance norm, is below a first threshold value, or else classify its node as a non-anchor node, giving rise to a partial order of the nodes;

every time a node (X) receives a message from another node (Y), the node (X) performs the following steps:

to check that the node (Y) precedes the node (X) in the partial order;

to apply a recursive filter on the current state and measurement, giving an updated state; and to update the status of the node (X) in the partial order; and the method also comprises the step:

to repeat the above steps, giving the position and orientation of each node.

A lot of advantages with the method according to the present invention are listed further on in the description.

A further advantage in this context is achieved if said method comprises the step: to find said position and orientation sequentially.

According to another embodiment it is an advantage if said method comprises the step: to find said position and orientation partially of fully in parallel. Furthermore, it is an advantage in this context if said recursive filter is a recursive least square filter of weighted recursive least square filter.

According to another embodiment it is an advantage if said recursive filter is a Kalman filter.

A further advantage in this context is achieved if said method also comprises the step: to assign an initially classified anchor node (A) a minimum fixed rank, wherein rank refers to an entity obeying a total order, wherein an anchor node (A) always precedes an on-anchor node in said partial order.

Furthermore, it is an advantage in this context if said method also comprises the step: to assign a non-anchor node (X) that receives and uses data from a set of nodes a rank which is higher than the highest rank of said set of nodes. A further advantage in this context is achieved if said method also comprises the step: to reclassify a non-anchor node (X) as an anchor node (A) during updating if said measure of uncertainty of the state estimate is below said first threshold value, and to freeze is current rank.

Furthermore, it is an advantage in this context if said method also comprises the step: for each node to store estimated angle of arrival (AOA) by a node (X) from every neighbour node, error (variance) of AOA estimate, estimated orientation of node (X), error (variance) of orientation estimate, estimated position, and error (covariance) of position estimate.

The above mentioned problems can also be solved by at least one computer program product according to Claim 19. The at least one computer program product is/are directly loadable into the internal memory of at least one digital computer. The at least one computer program product comprises software code portions for performing the steps of the method according to the present invention, when the at least one product is/are run on the at least one computer.

It will be noted that the term "comprises/comprising" as used in this description is intended to denote the presence of a given characteristic, step or component, without excluding the presence of one or more other characteristic features, integers, steps, components or groups thereof.

Embodiments of the invention will now be described with a reference to the accompanying drawings, in which:

DETAILED DESCRIPTION OF PREFERRED EMBODIMENTS

Figure 1:
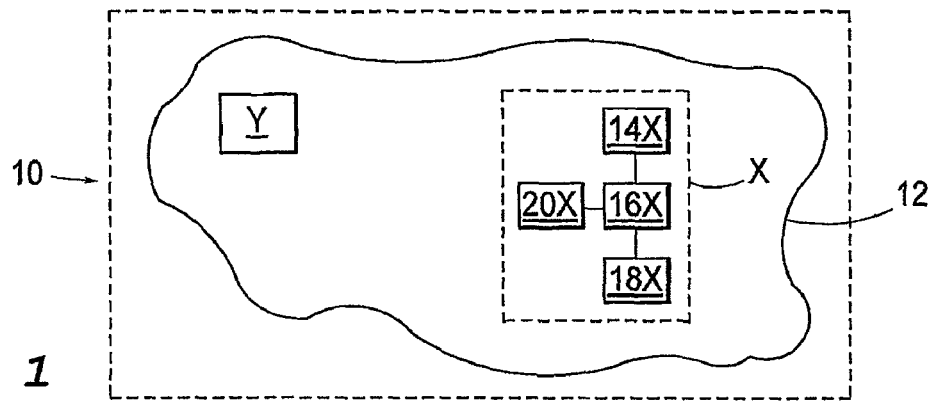
FIG. 1 is a block diagram of a system according to the present invention.

In FIG. 1 there is disclosed a block diagram of a system 10 operable to localize, i.e. find positions and orientations of nodes X, . . . , Y communicating in a wireless network 12. For the sake of simplicity there is only disclosed two nodes X, Y in FIG. 1, wherein only the node X is disclosed completely. The node X comprises a partial ordering means 14X operable to initially classify its node X as an anchor node A if a measure of uncertainty of the state estimate, such as a state estimate error covariance norm, is below a first threshold value, or else classify its node as a non-anchor node, giving rise to a partial order of the nodes X, Y. The node X also comprises a control means 16X connected to the partial ordering means 14X, and a recursive filter means 18X also connected to the control means 16X. Also disclosed in FIG. 1 is a memory means 20X connected to the control means 16X. Every time a node X receives a message from another node Y, the control means 16X is operable to check that the node Y precedes the node X in the partial order. The recursive filter means 18X is operable to be applied on the current state and measurement, giving an updated state. The partial ordering means 14X is operable to update the status of the node X in the partial order. The control means 16X is operable to repeat the above, giving the position and orientation of each node X, Y.

Figure 2:
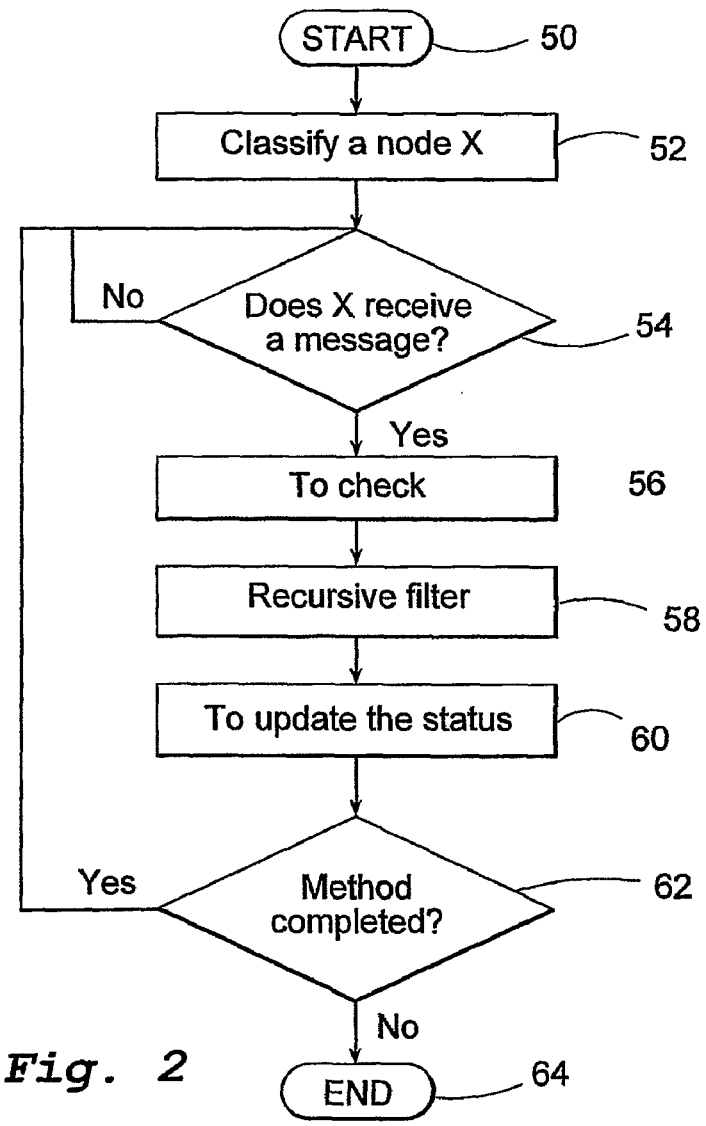
FIG. 2 is a flow chart of a method according to the present invention.

In FIG. 2 there is disclosed a flow chart of a method for localization, i.e. finding positions and orientations of nodes X, . . . , Y communicating in a wireless network. The method begins at block 50. The method continues, at block 52, with the step: to initially classify a node X, . . . , Y as an anchor node A if a measure of uncertainty of the state estimate, such as a state estimate error covariance norm, is below a first threshold value, or else classify its node as a non-anchor node, giving rise to a partial order of the nodes X, . . . , Y. Thereafter, the method continues, at block 54, to ask the question: Does the node X receive a message from another node Y ? I the answer to this question is negative, this block 54 is performed once again. If on the other hand the answer is affirmative, the method continues, at block 56, wherein the node X performs the step: to check that the node Y precedes the node X in the partial order. If that is the case, the method continues, at block 58, with the step: to apply a recursive filter on the current state and measurement, giving an updated state. Thereafter, the method continues, at block 60, with the step: to update the status of the node X in the partial order. The method continues, at block 62, to ask the question: is the method completed ? If the answer is negative the method is completed at block 64. If on the other hand the answer is affirmative, the step according to block 54 is performed once again.

Figure 3:
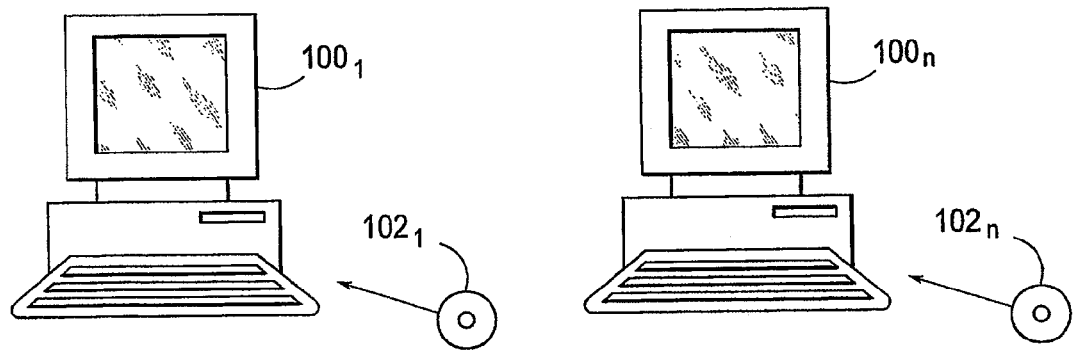
FIG. 3 schematically shows a number of computer program products according to the present invention.

In FIG. 3 there is disclosed a schematic diagram of some computer program products according to the present invention. There is disclosed n different digital computers $100_1, \ldots, 100_n$, wherein n is an integer. There is also disclosed n different computer program products $102_1, \ldots, 102_n$, here showed in the form of compact discs. The different computer program products $102_1, \ldots, 102_n$ are directly loadable into the internal memory of the n different digital computers $100_1, \ldots, 100_n$. Each computer program product $102_1, \ldots, 102_n$ comprises software code portions for performing some or all the steps of FIG. 2 when the product(s) $102_1 \ldots, 102_n$ is/are run on said computer(s) $100_1 \ldots, 100_n$. Said computer program products $102_1, \ldots, 102_n$ can e.g. be in the form of floppy disks, RAM disks, magnetic tapes, opto magnetical disks or any other suitable products.

Figure 4:
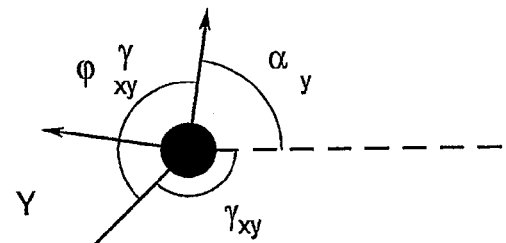
FIG. 4 discloses the angles related to two nodes X and Y.
Figure 4:
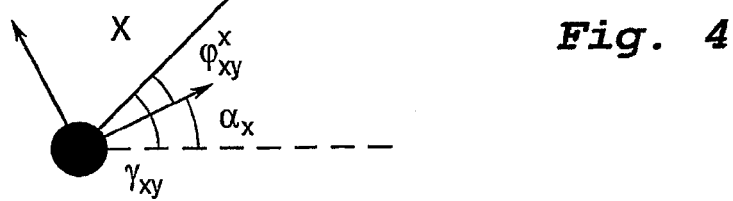
Figure 5:
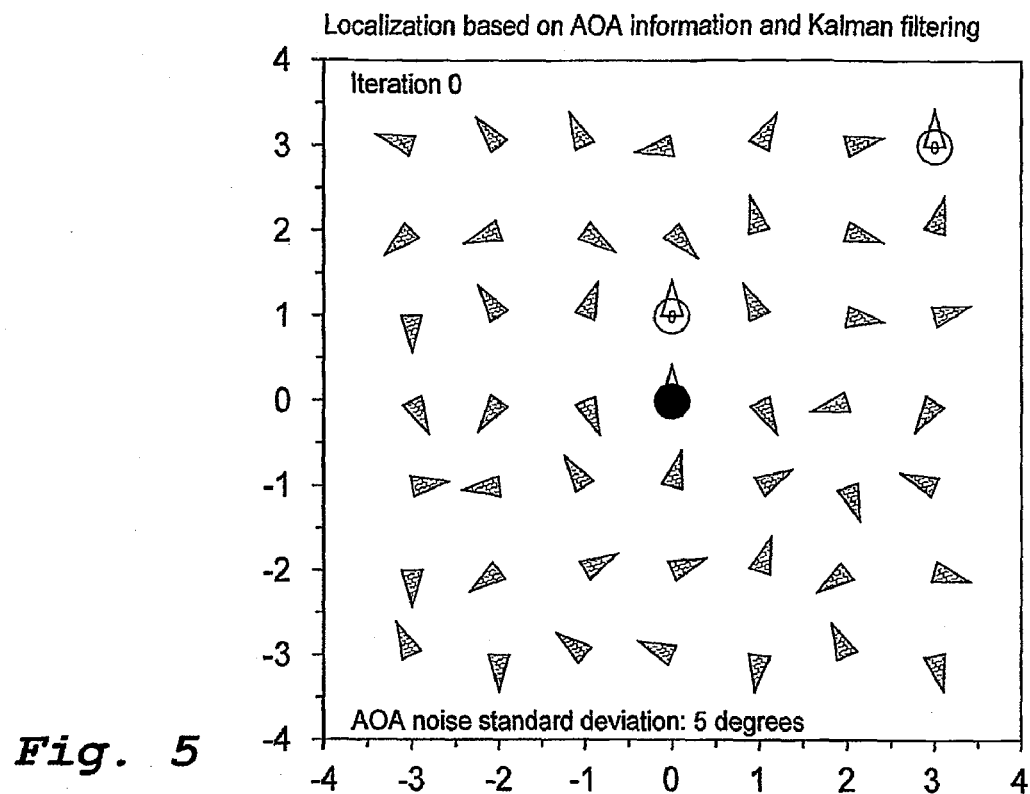
FIGS. 5-25 show a sequence of iteration 0-20.
Figure 6:
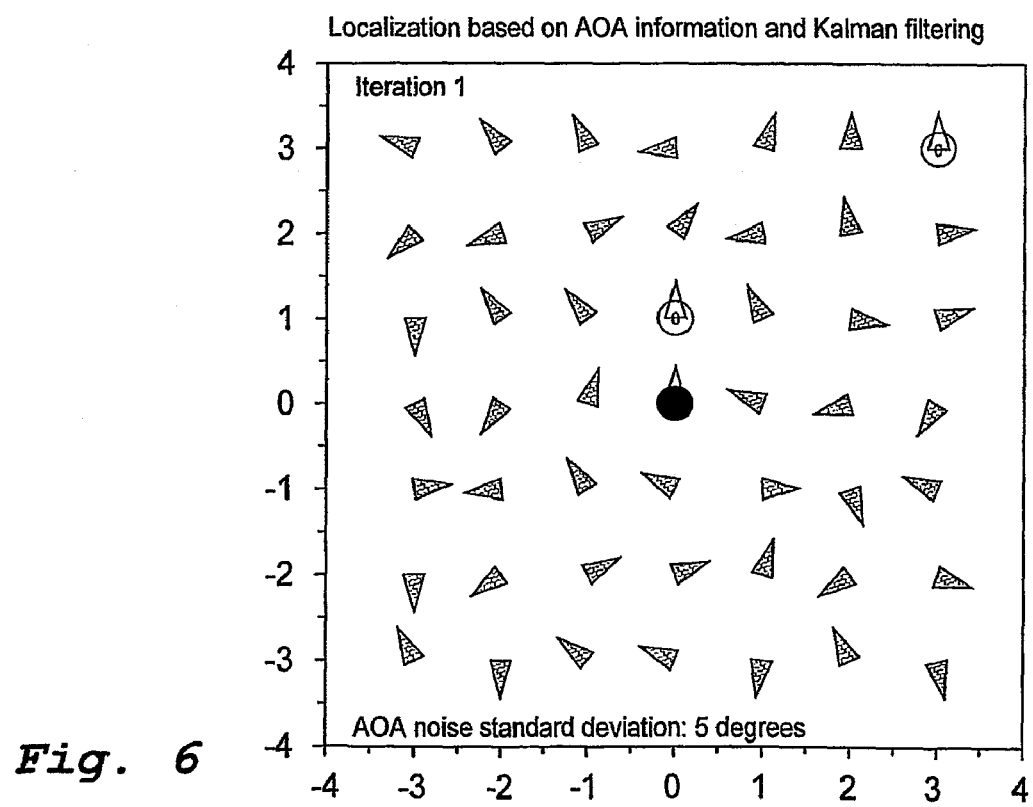
Figure 7:
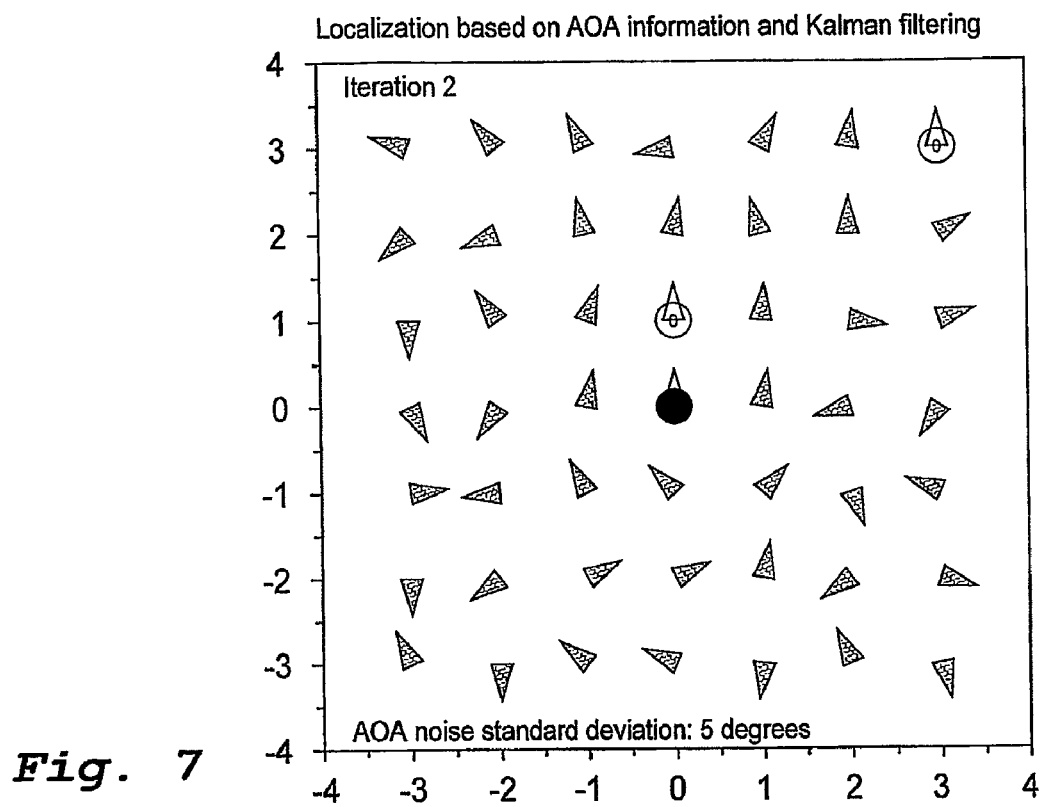
Figure 8:
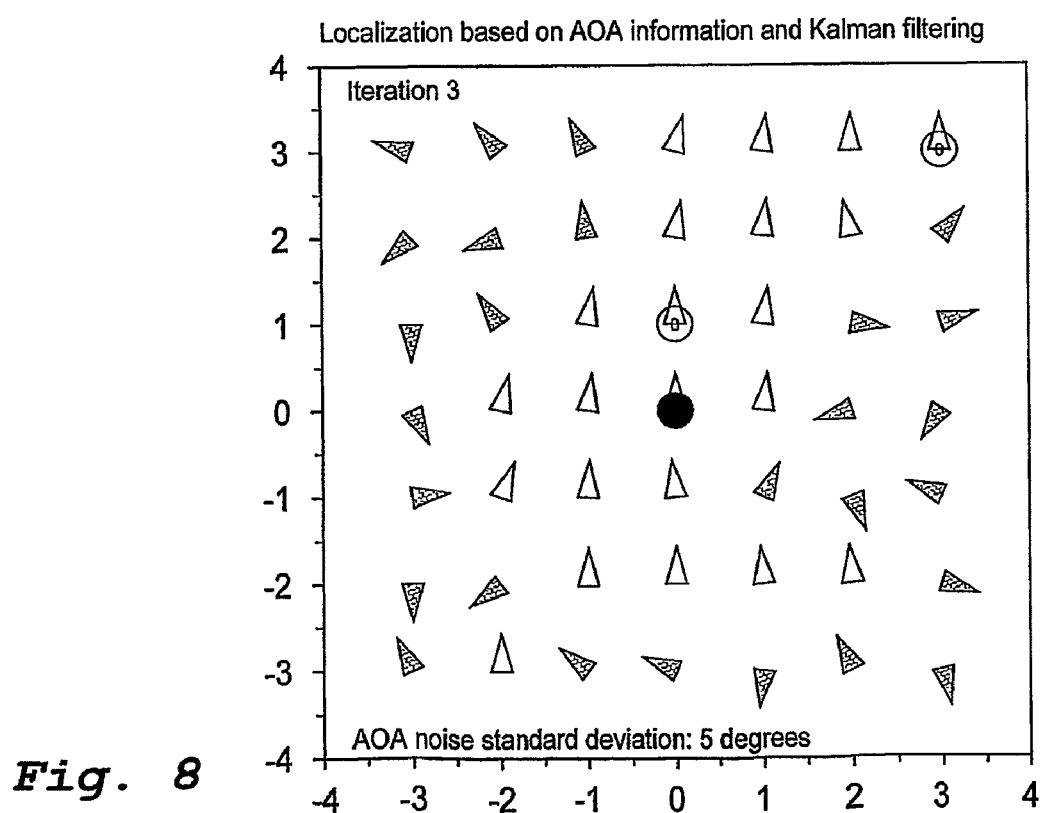
Figure 9:
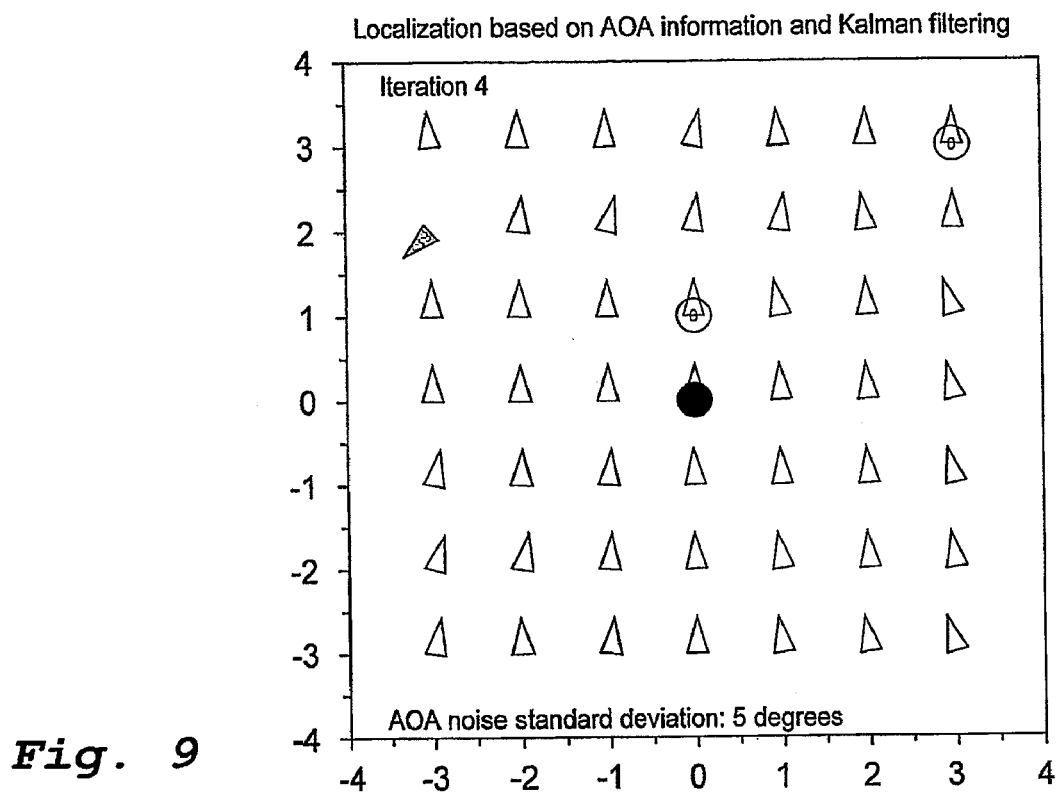
Figure 10:
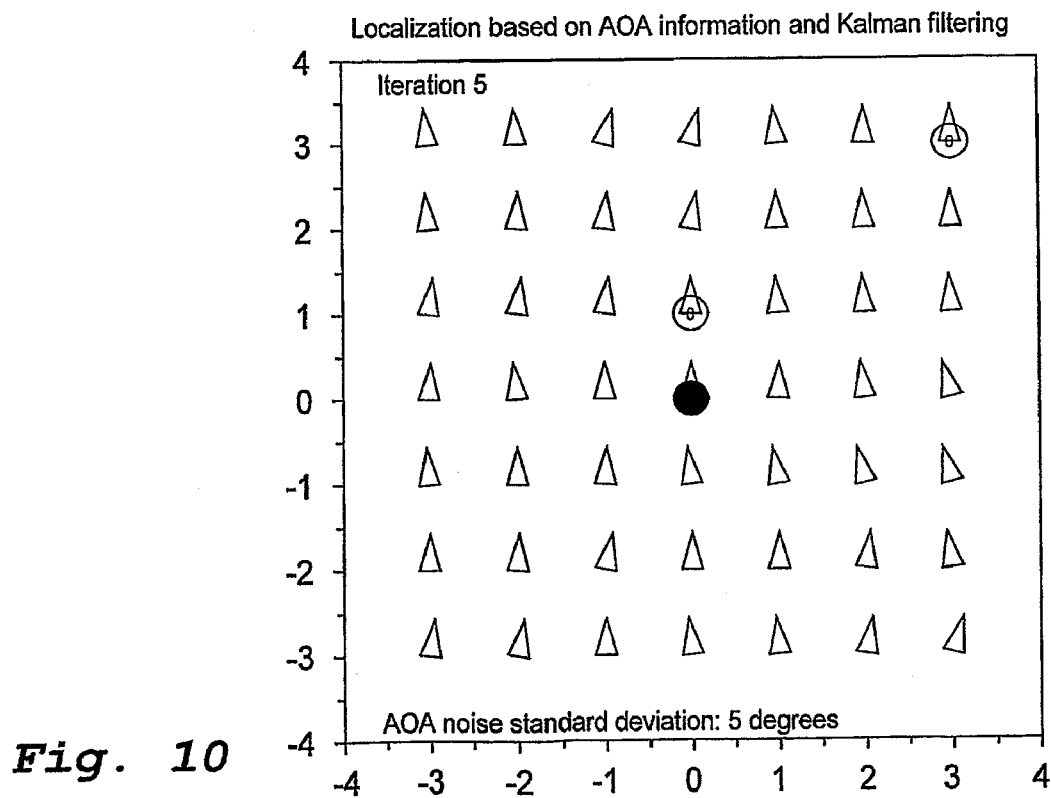
Figure 11:
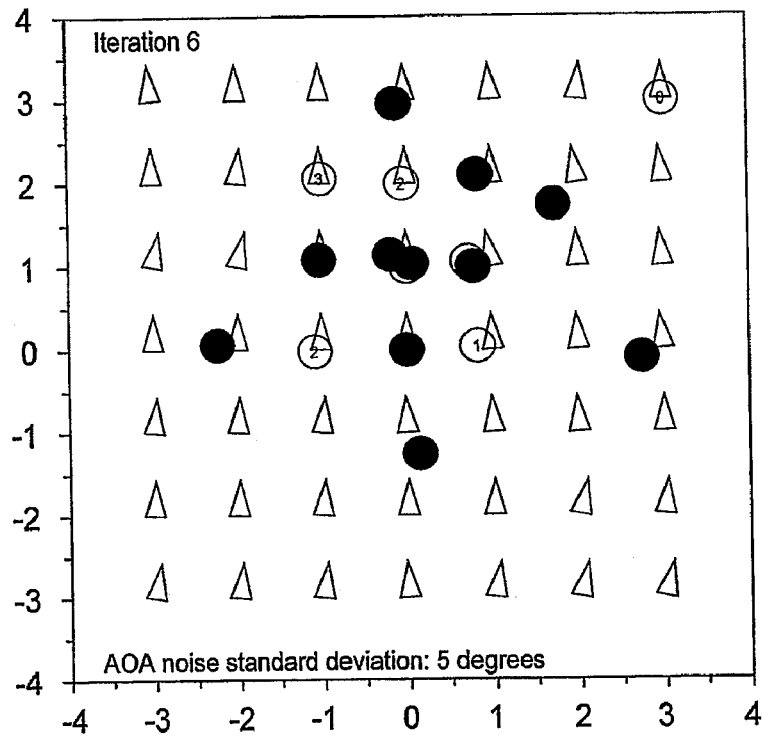
Figure 12:
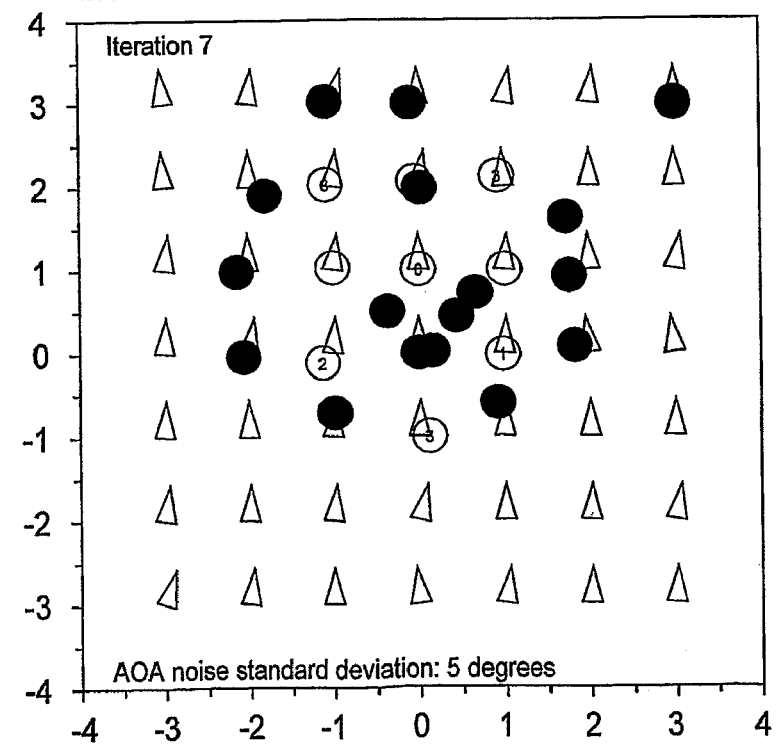
Figure 13:
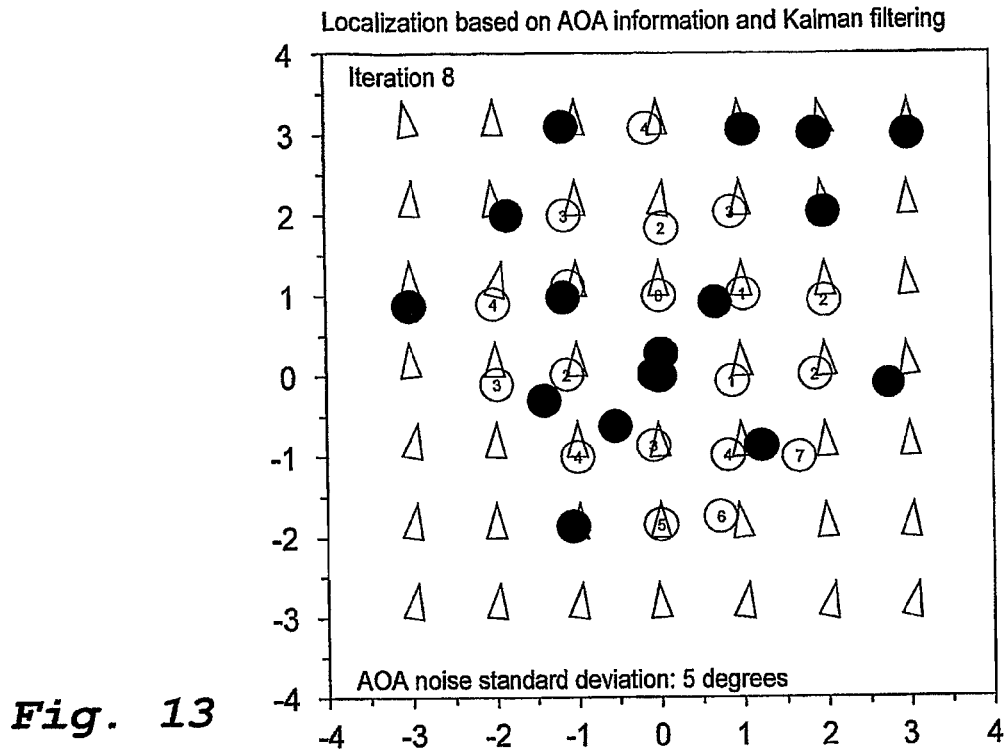
Figure 14:
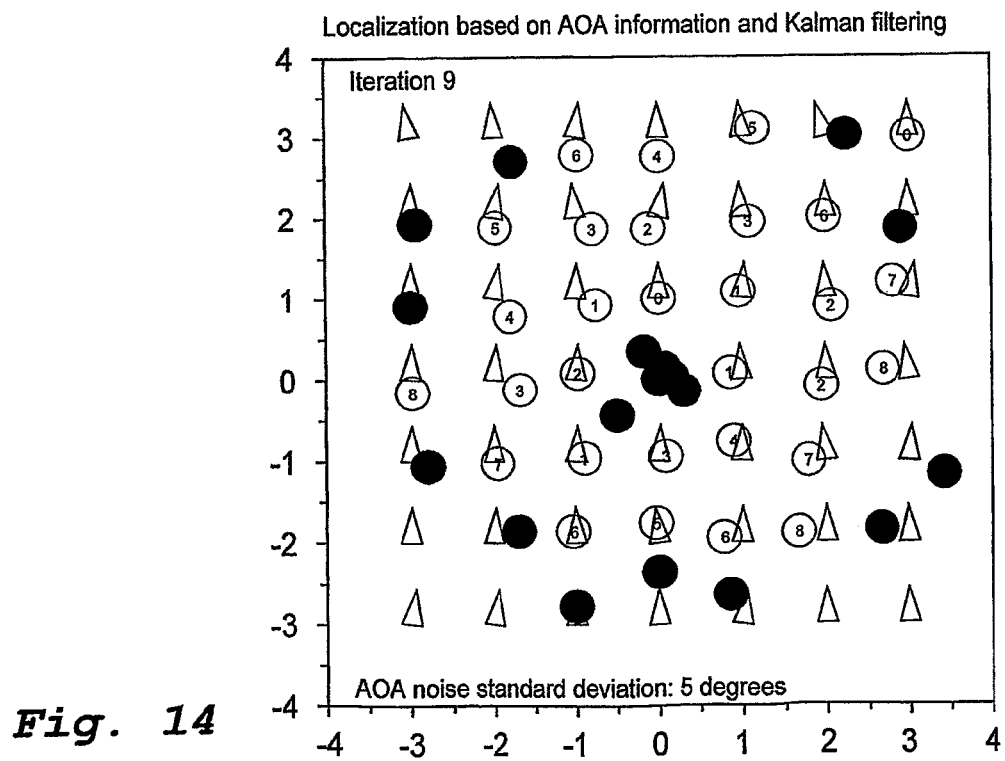
Figure 15:
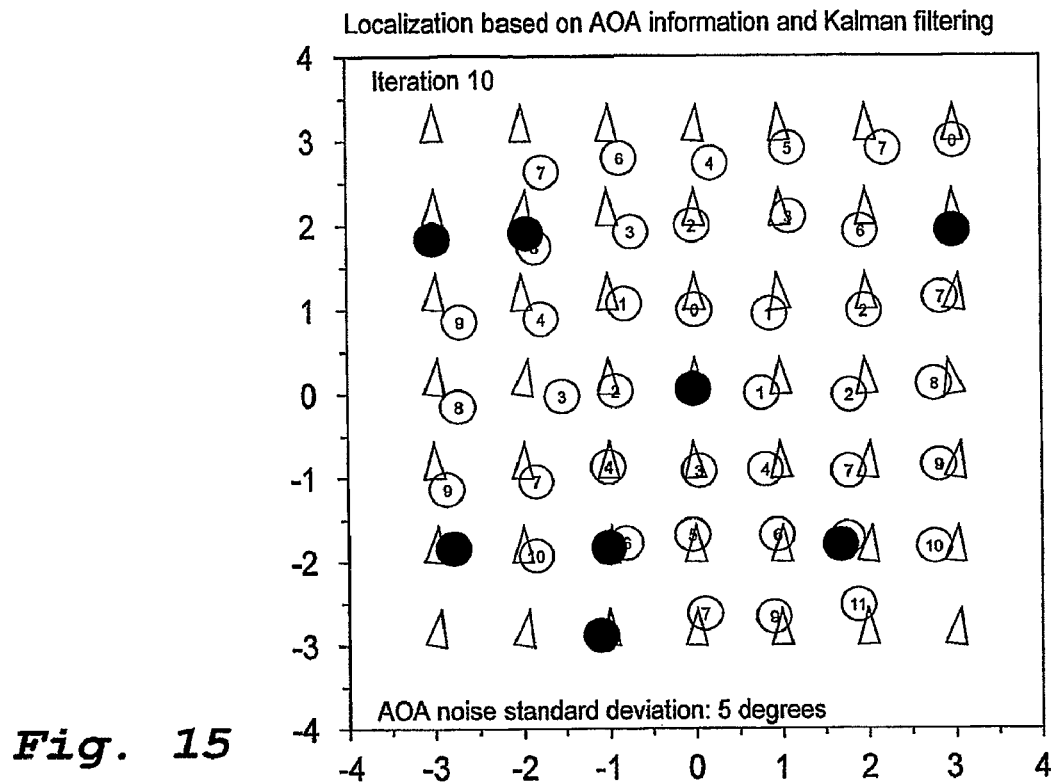
Figure 16:
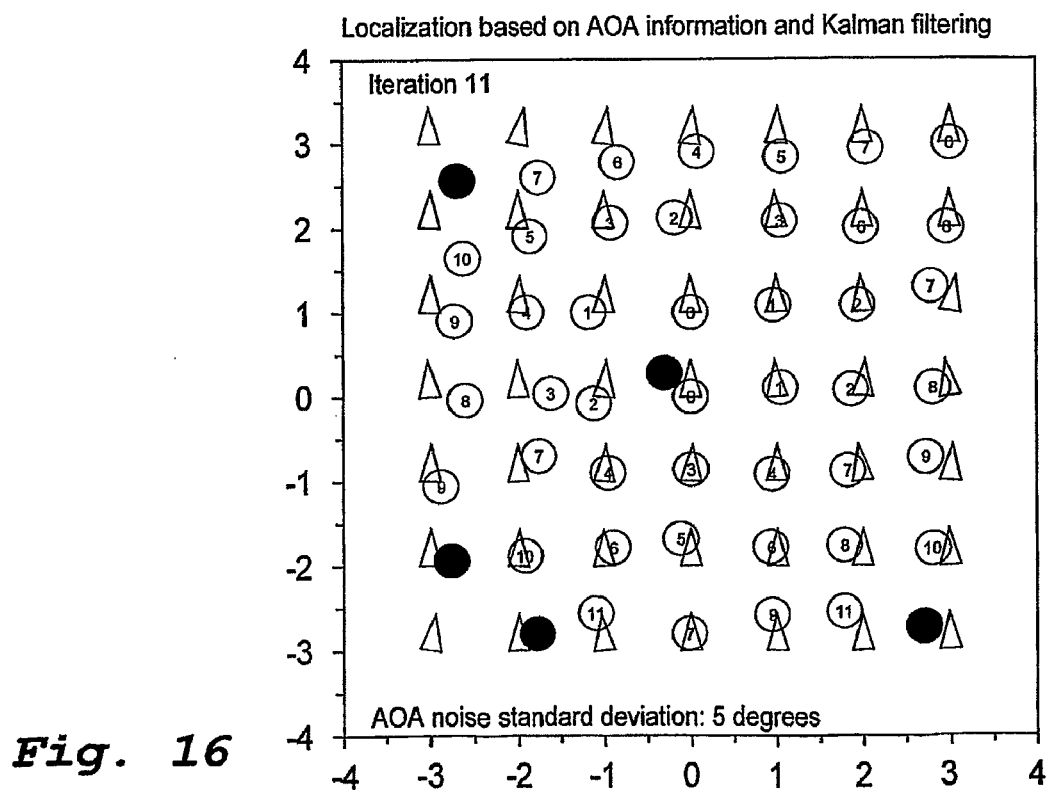
Figure 17:
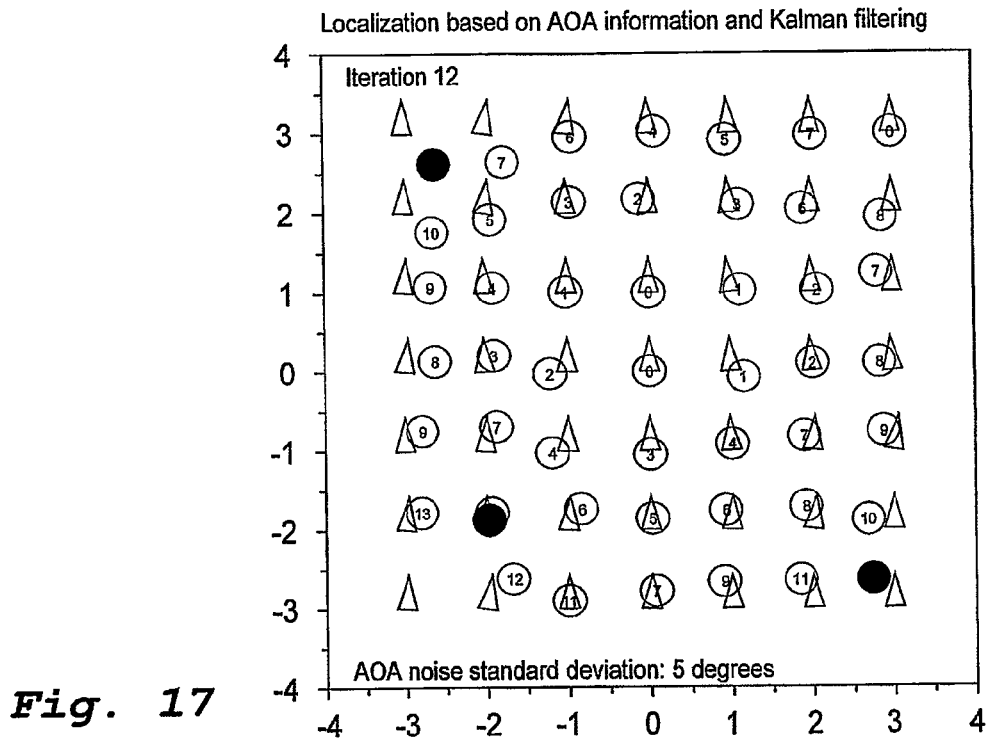
Figure 18:
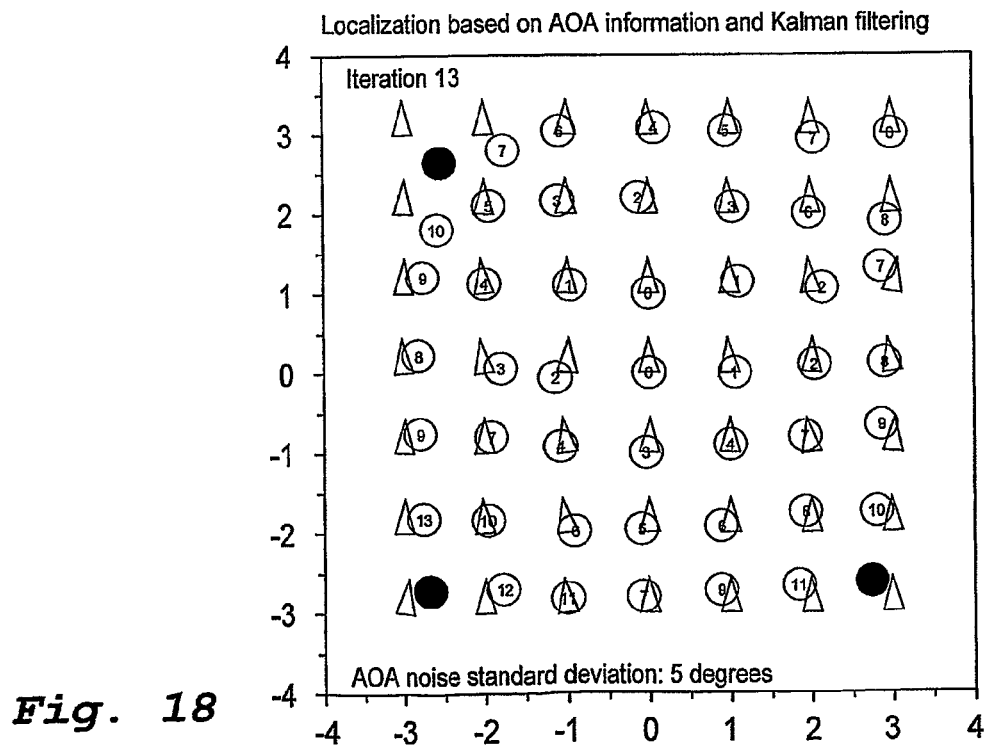
Figure 19:
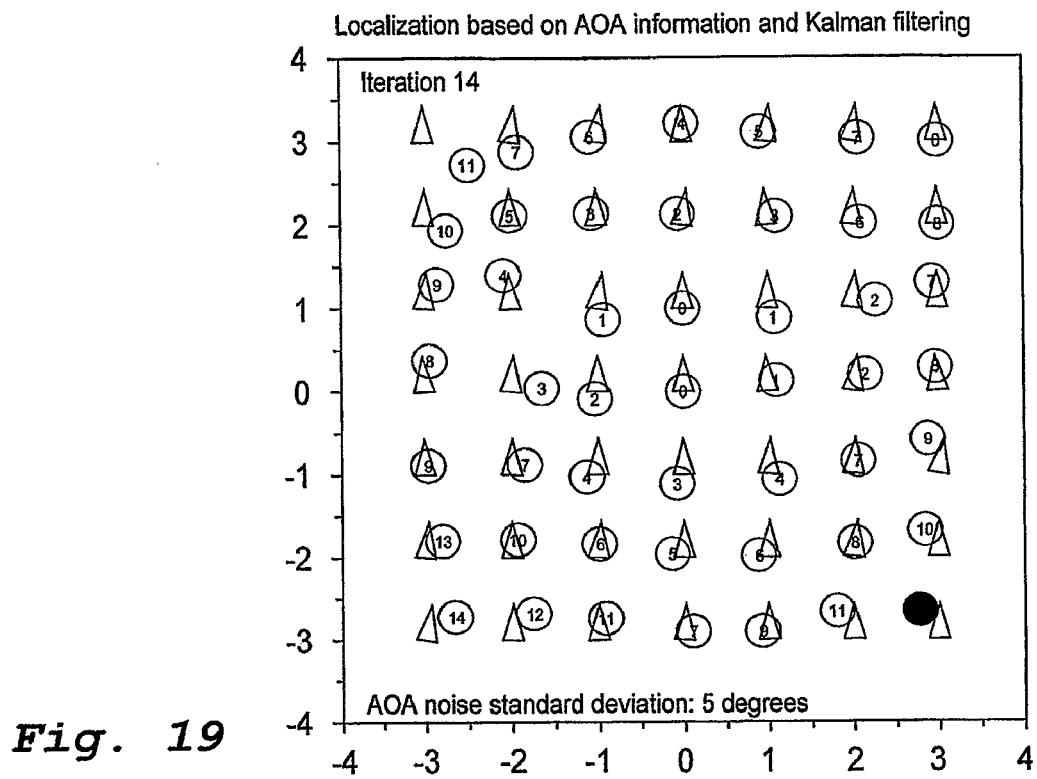
Figure 20:
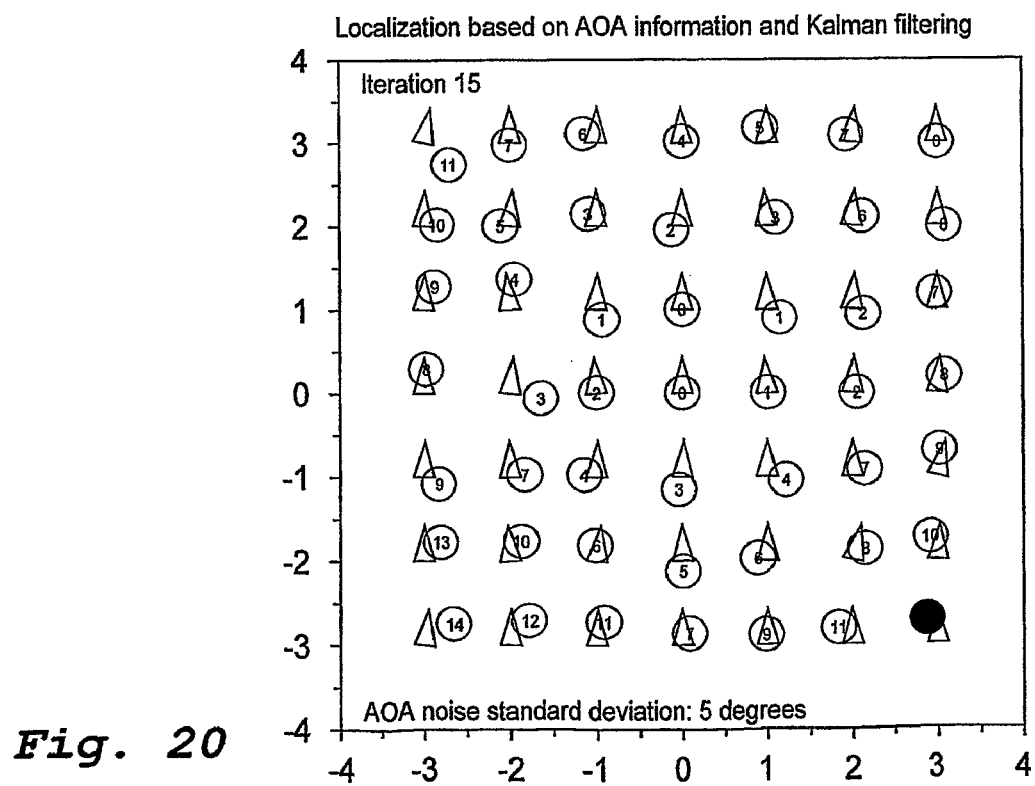
Figure 21:
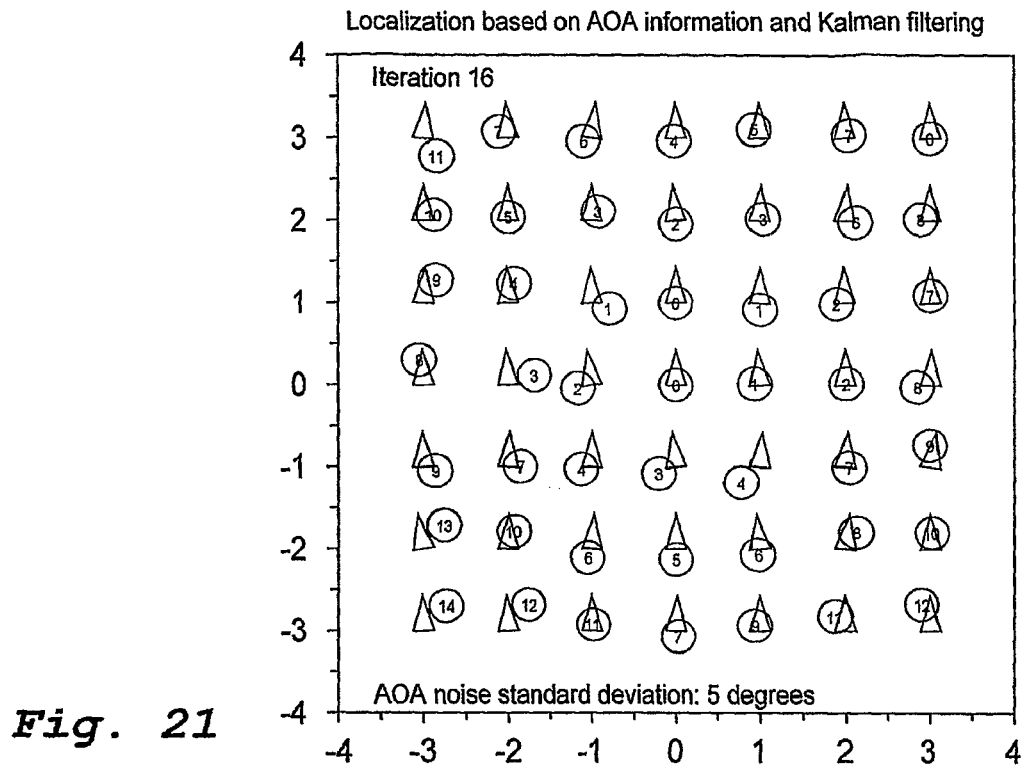
Figure 22:
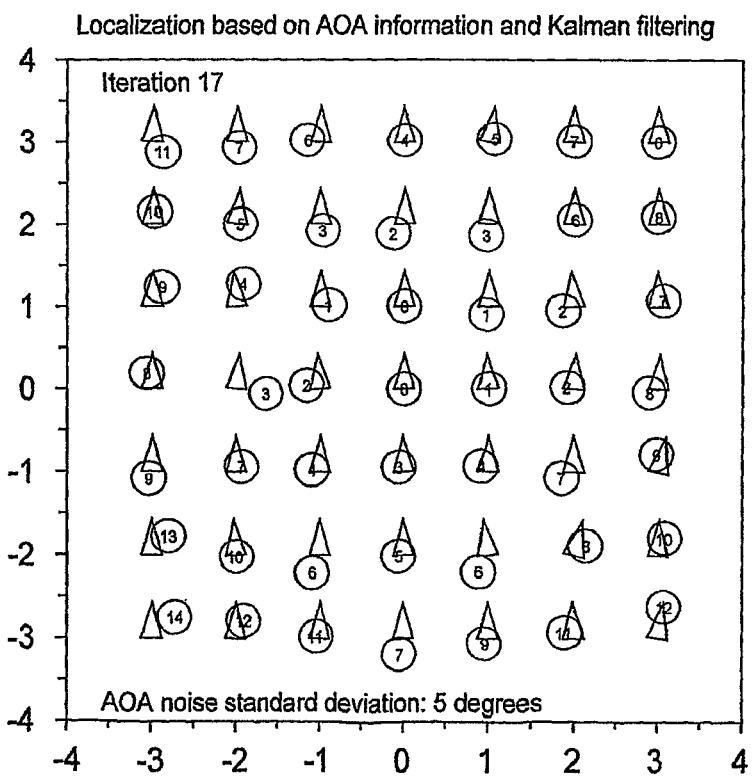
Figure 23:
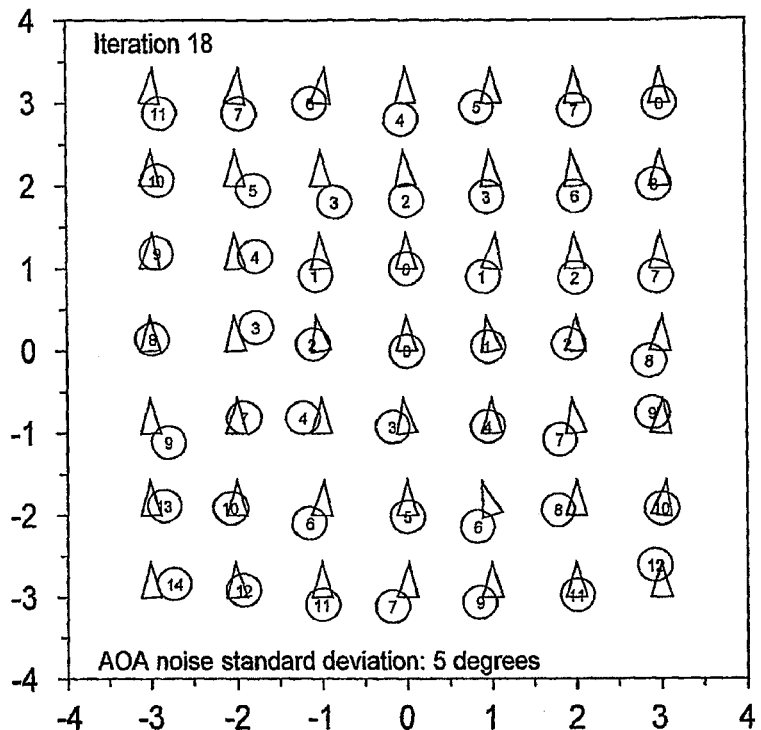
Figure 24:
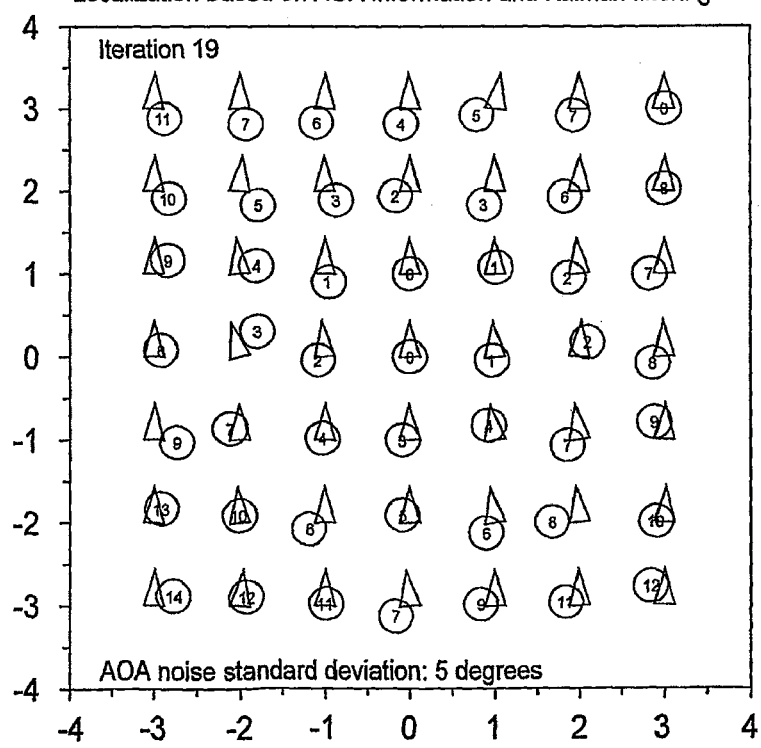
Figure 25:
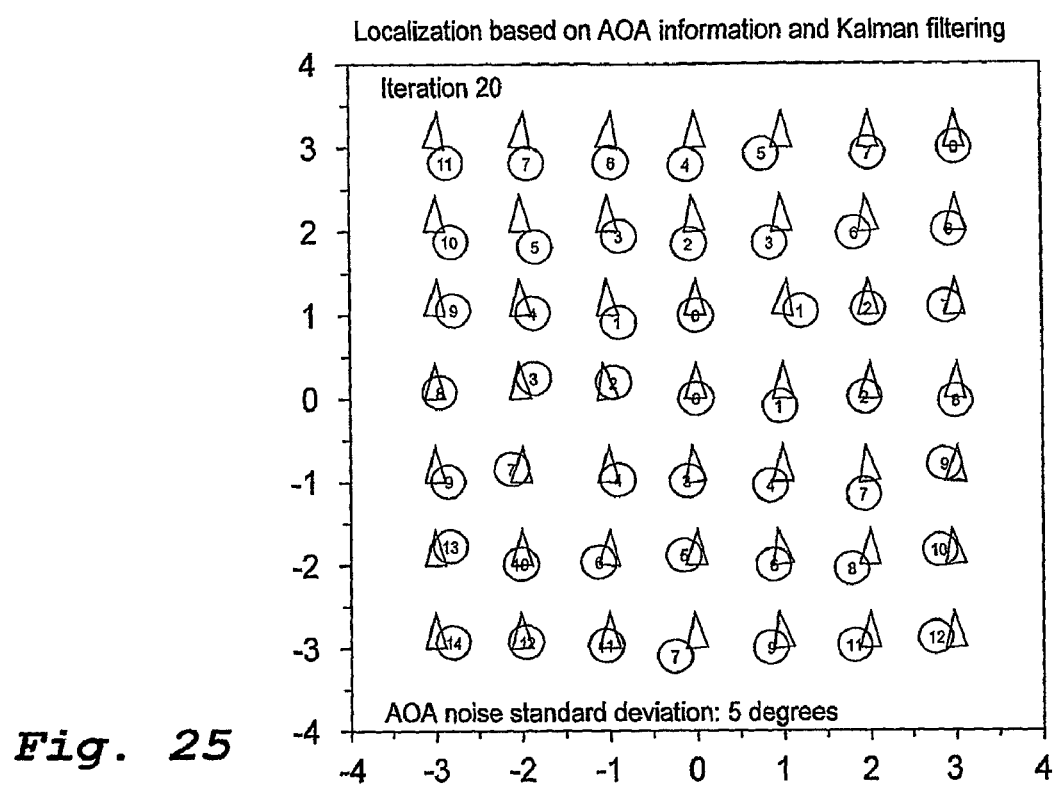

In FIG. 4 there is disclosed the angles related to the two nodes X and Y. In FIGS. 5-25 there is disclosed a sequence of iterations 0-20. Triangles show estimated orientations. Circles show estimated positions. Actual orientations are upwards. Actual positions are on the gridpoints given by the bases of the triangles. Initial orientation estimates are uniformly random. Initial position estimates are all at the origin. Black shapes indicate non-anchor status, and white shapes indicate anchor status. Numbers in circles show current ranks at position anchors. Initial anchors are located at (0,0), (0,1), and (3,3). The position estimation phase is started with a delay of five iterations after the orientation estimation phase. On each iteration, all nodes send one broadcast message each. Every node communicates with neighbours within 1.5 gridsteps, i.e. inner (non-border) nodes communicate with eight neighbours.

1 INTRODUCTION

A new method for distributed localization is proposed, i.e. finding positions and orientations of nodes communicating in wireless networks. The method is based on using directional information (angle-of-arrival, AOA), and optionally distance information, combined with estimation by recursive filters such as Kalman filters, recursive least squares filters, Bayesian filters, or particle filters. The method expresses the localization problem as a set of linear equations, and ensures stability and convergence by imposing a partial order on the nodes. The method has the following advantages:

Fast, only little computation needed
Requires only small program in each node
All programs are identical
Requires only little RAM in each node
Entirely distributed algorithm; no centralized computation is needed
Does not require any synchronization of messages
Orientation and position updated for every message received (recursive estimation)
Orientation and position estimates can be run as parallel processes without risking instability
Robust against and designed for heavy noise in measurements
Automatic error estimates for all parameters
Two anchor nodes are sufficient and may be centrally placed
Over time, nodes automatically become anchor nodes
Allows mobile nodes
Allows dynamic addition and removal of nodes
All nodes are treated uniformly
For radio communication, simple, inexpensive and power efficient antennas suffice (e.g. ESPAR)
Can optionally integrate compass measurements for computing orientation
Can optionally integrate distance measurements for computing position
Not dependent on good initial guesses
Convergence guaranteed
Linearity of system allows linear Kalman filters
Examples of applications include:

Wireless sensor networks for wildfire monitoring. Nodes are dropped from airplanes and monitor the spread of wildfires. Directional antennas are used for AOA measurements.

Detection of person movements in buildings. Security applications in buildings to detect how people move. Can be used for detection of movements by unauthorized visitors at companies or safety-related installations.

Habitat monitoring and wild-life tracking. Registration of movements by wild animals in air, soil, or water. Wireless communication can be performed by electromagnetic communication in the atmosphere, and sound or pressure waves in soil and water.

Traffic monitoring and vehicle tracking. The motion of vehicles relative to each other and the ground for collision warnings or other impending accident predictions.

Monitoring the state of vehicles and machines. Nodes can be implanted in machines and devices to monitor the kinematics to detect wear or other changes in the structure. If nodes are molded into the structure, they first detect their positions automatically, and then continue to detect changes. For instance, sensors may be molded into car tires to monitor the deformation.

Measurements of buildings and structures. Nodes may be embedded in concrete and other molded materials. After placement they measure their location and report the state of the structure, e.g. the performance of central heating, or structural damage after earth quakes.

Optimization of communications. In a mobile system, nodes may use localization to optimize their communications, e.g. by location-aware routing algorithms (geographic routing) and communication protocols. Wireless sensor networks may reduce power consumption by eliminating the need for route discovery.

State estimation for mobile robots. Robots can be seen as mobile nodes, and their location and configuration can be estimated.

Environmental monitoring. Nodes may be distributed to monitor environmental parameters such as temperature, concentration of substances, or radiation.

Location sensitive billing. Using location information, wireless service providers may offer location-dependent services.

Emergency calls. In case of emergency, a wireless node may automatically report its location and notify rescue authorities.

Mobile advertising. Stores may be able to track consumer locations and flash customized messages.

Asset tracking. Locating and retrieving lost children, patients or pets; providing more efficient management of assets in a manufacturing site.

Smart tour guides and shopping guides. Services guiding shoppers or visitors based on their location in department stores, enterprises, hospitals, manufacturing sites, malls, museums, and campuses.

Fleet management. Tracking and operation of fleets such as police forces, emergency vehicles, shuttle and taxi companies.

Location-based wireless security. By using location information, only people at certain locations can access certain sensitive information.

Military surveillance. Location sensing for military surveillance of installations or areas for controlling infiltration by insurgency groups.

Medical applications. Nodes can be injected into the blood stream or inserted into the digestive system to collect location-based data for diagnosis. Sensors can be used for long-term monitoring of the health state of outpatients, or patients at a remote location.

2 NOTATION $x$=Position of node X (2D vector)
$\hat{x}$=Estimate of x
$V(\hat{x})$=Covariance matrix of vector $\hat{x}$
$\phi_{xy}^z$=Angle of arrival (AOA) from Y to X in Z's local coordinate system
$\gamma_{xy}=\pi+\gamma_{yx}=\alpha_z+\phi_{xy}^z$, AOA from Y to X in the global coordinate system
$\hat{\gamma}_{xy}^z$=AOA from Y to X in the global coordinate system, estimated by node Z
$\alpha_x$=Orientation of node X
$V(\hat{x})$=Variance of scalar estimate $\hat{x}$
$v$=Unit vector parallel with $\overline{XY}$
$m(x)$=Measurement of parameter x
$V(m(x))$=Measurement variance of parameter x This method also works in three dimensional space, mutatis mutandis, but for simplicity of explanation, we describe the method in two dimensions.

3 NODE MEMORY USAGE

A node X stores the following data, representing state:
$\hat{\phi}_{xy}{}^x$=estimated AOA by X from every neighbour Y
$V(\hat{\phi}_{xy}{}^x)$=error (variance) of AOA estimate
$\hat{\alpha}_x$=estimated orientation of X
$V(\hat{\alpha}_x)$=error (variance) of orientation estimate
$\hat{x}$=estimated position
$V(\hat{x})$=error (covariance) of position estimate It is preferable to use $\phi$ for representing state rather than $\gamma$, since $m(\phi)$ can usually be considered approximately statistically independent of $\hat{\alpha}$.

4 SENDING MESSAGES

Nodes may send messages at will, and no synchronization is necessary. For orientation estimation, a node X sends a message to a neighbor Y containing the global AOA $\hat{\gamma}_{xy}{}^x = \hat{\alpha}_x + \hat{\phi}_{xy}{}^x$ and its variance $V(\hat{\gamma}_{xy}{}^x) = V(\hat{\alpha}_x) + V(\hat{\phi}_{xy}{}^x)$, assuming approximate independence of $\hat{\alpha}_x$ and $\hat{\phi}_{xy}{}^x$.

For position estimation, X broadcasts messages containing its position estimate $\hat{x}$ and variance $V(\hat{x})$.

These messages can be combined, so that X sends a broadcast message containing the whole list of $\hat{\gamma}_{xy}{}^x$ and $V(\hat{\gamma}_{xy}{}^x)$ for all its known neighbours, in addition to its estimated position and its variance.

5 RECEIVING MESSAGES AND COMPUTING ORIENTATION

When a node X receives a message from Y, it takes a measurement $m(\phi_{xy}{}^x)$ of the AOA as well as its variance $V(m(\phi_{xy}{}^x))$. It receives $\hat{\gamma}_{yx}{}^y = \pi + \hat{\gamma}_{xy}{}^y$ and $V(\hat{\gamma}_{yx}{}^y) = V(\hat{\gamma}_{xy}{}^y)$ in the message, and considers this a measurement of $m(\hat{\gamma}_{xy}) = \hat{\gamma}_{yx}{}^y - \pi$. Provided that $Y \prec X$ (i.e. Y precedes X in the partial ordering for orientation estimation described below), the estimates $\hat{\alpha}_x$ and $\hat{\phi}_{xy}{}^x$ can then be computed by a linear Kalman filter, using the measurement equation ($z=Hx$ in the Kalman filter, cf. appendix)

$$\begin{pmatrix} m(Y_{xy}) \\ m(\varphi_{xy}^x) \end{pmatrix} = \begin{pmatrix} 1 & 1 \\ 0 & 1 \end{pmatrix} \begin{pmatrix} \alpha_x \\ \varphi_{xy}^x \end{pmatrix}$$

Here, the left hand side represents a known measurement, and the right hand side describes how the measurement depends on the actual state, which is to be estimated. The matrix represents the output (measurement) matrix H in the Kalman filter. For orientation estimation, the Kalman filter can thus be applied with the following parameters (cf. program in the appendix):

$$x = \begin{pmatrix} \hat{\alpha}_x \\ \hat{\varphi}_{xy}^x \end{pmatrix}$$

$$p = \begin{pmatrix} V(\hat{\alpha}_x) & 0 \\ 0 & V(\hat{\varphi}_{xy}^x) \end{pmatrix}$$

$$z = \begin{pmatrix} \hat{Y}_{yx}^y - \pi \\ m(\varphi_{xy}^x) \end{pmatrix}$$

$$h = \begin{pmatrix} 1 & 1 \\ 0 & 1 \end{pmatrix}$$

$$q = Q_{orient} = \begin{pmatrix} q_\alpha & 0 \\ 0 & q_\varphi \end{pmatrix},$$

where $q_\alpha$ and $q_\varphi$ are user-defined parameters $$r = \begin{pmatrix} V(\hat{Y}_{yx}^y) & 0 \\ 0 & V(m(\varphi_{xy}^x)) \end{pmatrix}$$

Here, the matrix q describes the agility of the filter. When the non-zero elements of q are small, the filter converges slowlier, but produces more accurate results. For larger values, the filter reacts more quickly but lets more noise through.

If a direct compass reading $\beta_x = m(\alpha_x)$ is available, it can be included by adding one more row to the set of measurement equations, $$\begin{pmatrix} m(Y_{xy}) \\ m(\varphi_{xy}^x) \\ m(\alpha_x) \end{pmatrix} = \begin{pmatrix} 1 & 1 \\ 0 & 1 \\ 1 & 0 \end{pmatrix} \begin{pmatrix} \alpha_x \\ \varphi_{xy}^x \end{pmatrix}$$

In this case, the Kalman filter also needs the variance $V(\beta_x)$. This variance can typically be considered a constant, and can be determined through a calibration process. When this isn't possible, it may easily be estimated by e.g. another Kalman filter.

For orientation estimation including compass measurements, the Kalman filter parameters are changed as follows:

$$z = \begin{pmatrix} \hat{Y}_{yx}^y - \pi \\ m(\varphi_{xy}^x) \\ \beta_x \end{pmatrix}$$

$$h = \begin{pmatrix} 1 & 1 \\ 0 & 1 \\ 1 & 0 \end{pmatrix}$$

$$r = \begin{pmatrix} V(\hat{Y}_{yx}^y) & 0 & 0 \\ 0 & V(m(\varphi_{xy}^x)) & 0 \\ 0 & 0 & V(\beta_x) \end{pmatrix}$$

6 RECEIVING MESSAGES AND COMPUTING POSITION

When X receives a message containing the position estimate $\hat{y}$ and $V(\hat{y})$ from a neighbour Y, X first checks that $Y \prec X$ (i.e. Y precedes X in the partial ordering for position estimation). Then, X's own position estimate $\hat{x}$ and its variance $V(\hat{x})$ can be calculated by a linear Kalman filter via the equation $$z = m(Hy) = H\hat{y} = Hx$$

where $$v = (\cos \gamma_{xy}, \sin \gamma_{xy})$$

$$\gamma_{xy} = \hat{\alpha}_x + \hat{\phi}_{xy}{}^x$$

$$H = (-v_y, v_x)$$

$$V(z) \approx (v\hat{y})^2 V(\gamma_{xy}) + H^T V(\hat{y}) H$$

$$V(\gamma_{xy}) = V(\hat{\alpha}_x) + V((\hat{\phi}_{xy}{}^x))$$

and making the certainty equivalence assumption that $\gamma_{xy} = \hat{\gamma}_{xy}{}^x$ and $V(\gamma_{xy})$. $V(\hat{\gamma}_{xy}{}^x)$. The formula for $V(z)$ follows from the Gaussian approximation formula for variances applied to $z = H\hat{y}$. Since the estimate $\hat{\gamma}_{xy}{}^x$ from the orientation estimation is used in the position estimation, orientation estimates influence position estimates. However, position estimates do not affect orientation estimates, so errors introduced in orientation estimation will not run the risk of re-circulation and causing instability problems.

For position estimation, the Kalman filter can thus be applied with the following parameters:

$$x = \hat{x}$$
$$p = V(\hat{x})$$
$$z = H\hat{y}$$
$$h = H$$
$$q = Q_{pos} = \begin{pmatrix} q_x & 0 \\ 0 & q_x \end{pmatrix},$$

where $q_x$ is a user-defined parameter $$r = V(z)$$

If a measurement $r_{xy} = m(|y-x|)$ of the distance $|\overline{XY}|$ is available, e.g. by using the strength of the received signal (a.k.a. RSSI, received signal strength indication), it can be included in the estimation by adding two equations through the equation system $$\begin{pmatrix} H\hat{y} \\ \hat{y} - r_{xy}v \end{pmatrix} = \begin{pmatrix} -v_y & v_x \\ 1 & 0 \\ 0 & 1 \end{pmatrix} x$$

In this case, the Kalman filter will also need the variance $V(r_{xy})$. This variance can typically be considered a constant, and can be determined through a calibration process. When this isn't possible, it may easily be estimated by e.g. another Kalman filter.

For position estimation including distance measurements, the Kalman filter parameters are changed as follows:

$$z = \begin{pmatrix} H\hat{y} \\ \hat{y} - r_{xy}v \end{pmatrix}$$

$$h = \begin{pmatrix} -v_y & v_x \\ 1 & 0 \\ 0 & 1 \end{pmatrix}$$

$$r = V\left[\begin{pmatrix} H\hat{y} \\ \hat{y} - r_{xy}v \end{pmatrix}\right]$$

Here, z and r are given as block matrices.

7 STABILITY AND CONVERGENCE BY PARTIAL ORDERING

An essential feature of the method is the use of partial orderings.

Every node executes two processes, sequentially or in parallel, for 1) finding its orientation, and 2) for finding its position. These two processes are similar, and are structured as follows. Every time a node X receives a message from another node Y, X executes the following steps:

1. X checks that $Y \prec X$, i.e. Y precedes X in the respective partial order (orientation or position).
2. X applies a Kalman filter on the current state and measurement, and updates the state.
3. X updates its status in the partial order, as described below.

There may be one partial order for orientation and another for position. These orders do not need to be identical. The partial order can be defined on-the-fly, using only local information, in the following way:

1. Initially, some nodes are classified as anchors. These contain reliable state information from start, i.e. the variance of the state is zero, or small. These anchors are assigned rank zero.
2. Other nodes are classified as non-anchors. An anchor node A always precedes a non-anchor X in the partial order, $A \prec X$.
3. A non-anchor X that receives and uses data ($\gamma_{xy}$) from a set of neighbouring senders is assigned a rank which is one (1) higher than the highest of the senders' ranks.
4. During execution of the algorithm, a node's estimate of its state x will normally gradually improve. This can be detected by observing the variance $V(x)$. When the variance of a non-anchor decreases below a given threshold, the node is reclassified as an anchor, and its current rank is frozen.
5. Lower-rank anchors precede higher-rank anchors in the partial order.

The consequence of this ordering is that errors cannot re-circulate and amplify. This avoids instability and guarantees convergence. In other words, the partial order defines the network as an acyclic graph.

Once a node becomes an anchor, its rank in the ordering is fixed. For mobile systems, it may sometimes be desirable to un-anchor an anchor A. This is permissible if neighbours that have previously used data from A will consider the un-anchored A to be an entirely new node. In order to implement this, A can include a random number in its broadcast message, where the number is changed if A is un-anchored. This allows the neighbours to detect when the status of A has changed.

In order to measure the AOA $\phi$, no measurement data from the sender is needed. It is enough for receivers to measure the bearing of the transmission, and the identity of the sender. Such measurements can be performed without observing any partial order, even for non-anchor to non-anchor communication.

For a fixed or non-mobile network, the AOA measurements $m(\phi)$ and the corresponding $V(m(\phi))$ can often be estimated by directly computing sample average and variance, without Kalman filtering, because $m(\phi)$ is typically approximately statistically independent of other measurements. The same holds for compass measurements $\beta$ and distance measurements $r$.

The user-settable smoothing parameter Q (also interpretable as the process noise covariance), can be gradually reduced locally in the nodes, in order to increase the measurement accuracy for fixed or non-mobile nodes. This can be conveniently implemented by comparing Q with the computed error $V(\hat{x})$. P in the Kalman filter. When the norm $\|P\|$ approaches $\|Q\|$, e.g. to within a factor 5, the node may divide Q by a factor, e.g. 1.2. In this way, convergence can be substantially accelerated.

8 APPENDIX

Kalman Filtering for a Constant

The Kalman filter [1, 2] is an example of a recursive filter, which takes a state and a measurement as inputs, and returns an updated state. The state is accompanied by its variance as an error estimate. In the case of a constant state, the Kalman filter can be described as follows, in pseudo-code:

$$S \leftarrow P + Q$$
$$K \leftarrow \frac{SH^T}{HSH^T + R}$$
$$\hat{x} \leftarrow \hat{x} + K(z - H\hat{x})$$
$$P \leftarrow S - KHS$$

Here,
$\hat{x}$=State estimate (vector)
z=Measurement (vector)
P=V($\hat{x}$), error (covariance) of $\hat{x}$ (matrix)
Q=Convergence speed parameters, can be interpreted as process noise covariance (matrix). This is a user-tunable parameter
R=V(z), covariance of measurement z (matrix)
H=Output matrix; describes how measurements depend on the state (matrix)

Implemented as executable computer code in a package such as Matlab or Scilab, the filter may be expressed as follows:
function [x,p]=kalman(x,p,z,h,q,r)

$s = p + q;$ $k = s*h'/(h*s*h'+r);$ $x = x + k*(z - h*x);$ $p = s - k*h*s;$ endfunction Abstract: For many wireless sensor network applications, finding the orientation and position of the nodes, localization, is an important prerequisite. If wireless nodes are limited to measuring amplitude and phase properties of radio transmissions for localization, the measurements will be affected by noise, caused by scattering and multipath fading, for instance. Consequently, a method for localization based on transmission properties needs to be noise resistant.

In this paper, we describe a fast, fully distributed, localized method which computes the node orientation, using directional antennas. An advantage of this method is its robustness against noise: The method uses only linear Kalman filtering. Some other advantages of the method is that it is able to optionally fuse compass data while remaining linear; it uses only little memory and computation; and antennas need directional diversity only on reception while transmissions may be broadcast, so no communication structure needs to be set up beforehand.

Keywords and phrases: Localization, orientation, wireless sensor network, directional antenna, linear Kalman filter, distributed algorithm, angle of arrival, self-organizing.

I Introduction

For many wireless sensor network (WSN) applications, finding the orientation and position of the nodes, localization, is an important prerequisite. These parameters can be computed from amplitude and phase measurements of radio transmissions between nodes in the network. For instance, the distance can be estimated by measuring the received signal strength (RSSI) and the angle of arrival (AOA) can be estimated by measuring the phase difference between two antenna elements (TDOA, time difference of arrival, or TOA, time of arrival). Unfortunately, such measurements are affected by many different types of noise sources, such as scattering, multipath fading, or interference by unrelated traffic. Most published algorithms for WSN localization based on transmission properties are designed to take a measurement "snapshot", and then compute localization parameters from this set of data [LR 2005], [Nic 2004], [MKB 2005], [SHS 2007]. In this paper, we propose a filter approach, which computes a new estimate at every node as soon as a new message is received. The main advantage with this method is the increased robustness against noise. A disadvantage with some filtering methods is the heavy computational demands, which may seem to create an obstacle for WSN with limited computational resources. However, we show that it is possible to perform the necessary computations using only a low-dimensional, linear Kalman filter [WB 2006], [GA 2001], which needs only a small amount of computation. This method can optionally fuse compass measurements, with the filter remaining linear. It can also accommodate mobile nodes, if motion is slow compared to the rate of message sending.

Another problem with many published algorithms is that they are restricted to range (distance) measurements, making it impossible to determine orientation. Of course, devices such as compasses can be used to measure orientation locally, but compasses are low-precision devices, and subject to magnetic deviation. One reason why range measurements are popular is that a simple dipole or monopole antenna suffices, whereas AOA measurements require a directional antenna. Such antennas are often perceived as large, complicated, and power-consuming, but recently, new types of simple directional antennas suitable for WSN have gained attention [Har 1978], [TS 2002].

The class of algorithms we target in this paper are fully distributed localization algorithms [LR 2005], not requiring any centralized computation. More specifically, in the terminology of [Nic 2004], we propose a distributed, localized algorithm for orientation finding in an absolute coordinate system, using AOA measurements. Another such method is DV-bearing [NN 2004], but this method uses triangulation, which makes it more sensitive to noise.

Kalman filtering has been used for the related problem of (collective) localization in robotics [RB 2002], [GF 2002]. Published algorithms in this field use non-linear models, suffering from problems caused by local minima, as well as requiring computationally demanding extended Kalman filters (EKF).

Since we can use a linear model and a linear Kalman filter, we do not suffer from these problems, and do not need a good initial guess for convergence.

Other features of the proposed method is that the antenna needs directional diversity only on reception while transmissions may be broadcast, so no synchronization or communication protocol needs to be arranged beforehand, i.e. it is self-organizing in the terminology of [LR 2005]; a single, arbitrarily placed anchor suffices; no message forwarding or flooding is necessary; there is 100% coverage, i.e. no nodes are rejected, but every node will automatically obtain an error estimate; and nodes can be added and removed dynamically.

II The Algorithm

A Network Model and Notation

A network N of communicating nodes in 2D is given. We consider a 2D setting for clarity, but the method can also be generalized to 3D. Each node X has computational capacity as well as ability to send broadcast messages to, and receive messages from neighbour nodes in a subset $N_x$ of N. When a node X receives a message from a node Y, X is also able to estimate the angle of arrival $\phi_{xy}^x$ in its local coordinate system, for instance with a directional antenna, as well as the variance of the estimate. X may optionally be able to include a device, e.g. a compass, to measure its global orientation in 2D. There must be at least one node which has some knowledge of its orientation, i.e. an estimate of its orientation with finite variance. We use the following notation (FIG. 1):

$\alpha_x$=orientation of node X.

$\phi_{xy}^z$=angle of arrival (AOA) from node Y to node X in node Z's local coordinate system. We assume this angle equals the angle of departure from X to Y.

$\gamma_{xy}=\pi+\gamma_{yx}=\phi_{xy}^z+\alpha_z$, AOA from Y to X in the global coordinate system.

$\gamma_{xy}^z$=AOA from Y to X in the global coordinate system, estimated by node Z.

$\hat{x}$=estimate of x $V(\hat{x})$=variance of estimate $\hat{x}$ $C(\hat{x}, \hat{y})$=covariance of $\hat{x}$ and $\hat{y}$ $r_{xy}$=distance between X and Y

B Storage Requirements

A node X stores the following state information:

$\hat{\alpha}_x$=the node's estimated orientation $V(\hat{\alpha}_x)$=variance in its estimated orientation $\hat{\gamma}_{xy}^x$=estimated AOA by X from neighbour Y in X's local coordinate system (one entry for each neighbour)

$V(\hat{\gamma}_{xy}^x)$=variance in AOA measurement (one entry for each neighbour)

$C(\hat{\alpha}_x,\hat{\gamma}_{xy}^x)$=covariance of orientation and AOA (one entry for each neighbor)

The initial variances are set to large values, representing "unknown". The initial estimates are not critical and can be set to zero.

C Sending Messages

At arbitrary intervals, node X broadcasts a message containing the global AOAs $\hat{\gamma}_{xy}^x=\hat{\phi}_{xy}^x+\hat{\alpha}_x$ and their variances $V(\hat{\gamma}_{xy}^x)=V(\hat{\phi}_{xy}^x)+V(\hat{\alpha}_x)$ for all neighbours Y.

D Receiving Messages and Computing Orientation

When X receives a message from a neighbour Y, X measures the AOA $\hat{\phi}_{xy}^x$ in its local coordinate system, together with the variance $V(\hat{\phi}_{xy}^x)$. Contained in the message is Y's estimate of the global angle of arrival $\hat{\gamma}_{yx}^y=\pi+\hat{\gamma}_{xy}^y$, and its variance $V(\hat{\gamma}_{yx}^y)=V(\hat{\gamma}_{xy}^y)$. Since the state vector $$x = \begin{pmatrix} \alpha_x \\ Y_{xy} \end{pmatrix}$$

and the vector of measured entities $$z = \begin{pmatrix} \varphi_{xy}^x \\ Y_{xy}^y \end{pmatrix}$$

are related by the linear equation z=Hx, where $$H = \begin{pmatrix} 1 & 1 \\ 0 & 1 \end{pmatrix}$$

we can now apply a linear Kalman filter. A compass can be included by appending its reading $\beta_x$ to z and appending a row (1 0) to the bottom of H.

The linear Kalman filter update equations are $$S \leftarrow P + Q$$
$$K \leftarrow \frac{SH^T}{HSH^T + R}$$
$$\hat{x} \leftarrow (1 - KH)\hat{x} + K\hat{z}$$
$$P \leftarrow (1 - KH)S$$

where $$P = \begin{pmatrix} V(\hat{\alpha}_x) & C(\hat{\alpha}_x, \hat{Y}_{xy}^x) \\ C(\hat{\alpha}_x, \hat{Y}_{xy}^x) & V(\hat{Y}_{xy}^x) \end{pmatrix}$$

is the covariance matrix of the estimate $\hat{x}$; Q is a user-tunable matrix representing the process noise covariance, alternatively the convergence rate, given beforehand; and $$R = \begin{pmatrix} V(\hat{\varphi}_{xy}^x) & C(\hat{\varphi}_{xy}^x, \hat{Y}_{xy}^y) \\ C(\hat{\varphi}_{xy}^x, \hat{Y}_{xy}^y) & V(\hat{Y}_{xy}^y) \end{pmatrix}$$

is the measurement noise covariance. P, Q, R, S are all symmetric 2×2 or 3×3 matrices, so the most computationally demanding operation is the inversion of the matrix $HSH^T+R$, which is easy for such small matrices.

III Results

We have implemented the algorithm in a simulator and tested it on the following configuration: A single anchor node was placed at the origin, and 16 non-anchor nodes were placed at the grid points of a square 4×4 grid, symmetrically placed around the origin. A node could hear other nodes within a radius of one grid step.

The standard deviation of bearing readings was 5.7°. The orientations were randomized uniformly in $[-\pi,\pi]$, and the initial guesses were all set to zero. The average orientation error in degrees for ten generations of broadcast messages from every node is shown in FIG. 2.

IV Discussion and Conclusions

In a situation with very little noise, a snapshot method may produce an accurate solution quickly, and may use fewer messages than a filter method. However, in a situation with substantial noise, a filter method may be preferable due to its built-in averaging. Since wireless transmissions are inherently noisy, we believe filter methods could be a promising approach.

The primary difficulty we met in the implementation of the proposed method is the determination of which range (multiple of $2\pi$ offset) of an angle should be chosen. We have proposed a linear model and an associated linear Kalman filter for measuring orientation. Here, the linearity is a key property, which brings along a number of desirable properties, in particular, robustness against noise. Small linear Kalman filters are easy to implement, inexpensive, and appear to be a competitive alternative for computing orientation in WSN, given that nodes are able to measure angle-of-arrival.

The invention claimed is:

1. A system operable to localize nodes (X, ..., Y) communicating in a wireless network, wherein each node (X, ..., Y) comprises a partial ordering means operable to initially classify its node (X, ..., Y) as an anchor node (A) if a measure of uncertainty of the state estimate, such as a state estimate error covariance norm, is below a first threshold value, or else classify its node (X, ..., Y) as a non-anchor node, giving rise to a partial order of said nodes (X, ..., Y), wherein each node (X, ..., Y) also comprises a control means connected to said partial ordering means, a to said control means connected recursive filter means, wherein every time a node (X) receives a message from another node (Y) said control means is operable to check that said node (Y) precedes said node (X) in said partial order, wherein a node (Y) preceding a node (X) meaning that said node (Y) being located in an ordered sequence comprising both node (X) and node (Y) and being located closer than node (X) to an initial anchor node in said sequence, whereby said recursive filter means is operable to be applied on said current state and measurement, giving an updated state, whereby said partial ordering means, if node (Y) precedes node (X), is operable to update said status of said node (X) in said partial order, wherein each control means is operable to repeat the above, giving the position and orientation of each node (X, ..., Y), and in that for said system at least one estimation is chosen from the group consisting of the two estimations, position estimation, where the measurement equation system comprises vectors y and x related as $Gy=Gx$, where G is a matrix, where y is a vector comprising a position coordinate estimate for a node (Y) received from said node (Y), and where x is a state vector comprising a position coordinate for node (X), and orientation estimation, where the measurement equation system comprises vectors z and x related as $z=Hx$, where H is a matrix, where z is a measurement vector comprising an angle of arrival for node (X), and where x is a state vector comprising an orientation coordinate and an angle of arrival for node (X).

2. A system according to claim 1, wherein said control means for each node (X, ..., Y) is operable to find said position and orientation sequentially.

3. A system according to claim 1, wherein said control means for each node (X, ..., Y) is operable to find said position and orientation partially or fully in parallel.

4. A system according to claim 1, wherein each recursive filter means is a recursive least square filter or weighted recursive least square filter.

5. A system according to claim 1, wherein each recursive filter means is a Kalman filter.

6. A system according to claim 1, wherein said partial ordering means is operable to assign an initially classified anchor node (A) a minimum fixed rank, wherein rank refers to an entity obeying a total order, wherein an anchor node (A) always precedes a non-anchor node in said partial order.

7. A system according to claim 6, wherein said partial ordering means of a non-anchor node (X) that receives and uses data from a set of nodes assign said non-anchor node (X) a rank which is higher than the highest rank of said set of nodes.

8. A system according to claim 7, wherein said partial ordering means is operable to reclassify a non-anchor node (X) as an anchor node (A) during updating if said measure of uncertainty of the state estimate is below said first threshold value, and its current rank is frozen.

9. A system according to claim 1, wherein each node (X, ..., Y) also comprises a to said control means connected memory means operable to store estimated angle of arrival (AOA) by a node (X) from every neighbour node, error of AOA estimate, estimated orientation of node (X), error of orientation estimate, and error of position estimate.

10. A method for localization of nodes (X, ..., Y) communicating in a wireless network, said method comprises the steps:

to initially classify a node (X, ..., Y) as an anchor node (A) if a measure of uncertainty of the state estimate, such as a state estimate error covariance norm, is below a first threshold value, or else classify its node (X, ..., Y) as a non-anchor node, giving rise to a partial order of said nodes (X, ..., Y);

every time a node (X) receives a message from another node (Y), said node (X) performs the following steps:

to check that said node (Y) precedes said node (X) in said partial order, wherein a node (Y) preceding a node (X) meaning that the node (Y) being located in an ordered sequence comprising both node (X) and node (Y) and being located closer than node (X) to an initial anchor node in said sequence;

to apply a recursive filter on the current state and measurement, if node (Y) precedes node (X), giving an updated state; and to update said status of said node (X) in said partial order; and said method also comprises the step:

to repeat the above steps, giving the position and orientation of each node (X, ..., Y); and in that for said method at least one estimation is chosen from the group consisting of the two estimations, position estimation, where the measurement equation system comprises vectors y and x related as $Gy=Gx$, where G is a matrix, where y is a vector comprising a position coordinate estimate for node (Y) received from said node (Y), and where x is a state vector comprising a position coordinate for node (X), and orientation estimation, where the measurement equation system comprises vectors z and x related as $z=Hx$, where H is a matrix, where z is a measurement vector comprising an angle of arrival for node (X), and where x is a state vector comprising an orientation coordinate and an angle of arrival for node (X).

11. A method for localization according to claim 10, wherein said method comprises the step:

to find said position and orientation sequentially.

12. A method for localization according to claim 10, wherein said method comprises the step:

to find said position and orientation partially or fully in parallel.

13. A method for localization according to claim 10, wherein said recursive filter is a recursive least square filter or weighted recursive least square filter.

14. A method for localization according to claim 10, wherein said recursive filter is a Kalman filter.

15. A method for localization according to claim 10, wherein said method also comprises the step:

to assign an initially classified anchor node (A) a minimum fixed rank, wherein rank refers to an entity obeying a total order, wherein an anchor node (A) always precedes a non-anchor node in said partial order.

16. A method for localization according to claim 15, wherein said method also comprises the step:

to assign a non-anchor node (X) that receives and uses data from a set of nodes a rank which is higher than the highest rank of said set of nodes.

17. A method for localization according to claim 16, wherein said method also comprises the step:

to reclassify a non-anchor node (X) as an anchor node (A) during updating if said measure of uncertainty of the state estimate is below said first threshold value, and to freeze its current rank.

18. A method for localization according to claim 10, wherein said method also comprises the step:

for each node (X, ..., Y) to store estimated angle of arrival (AOA) by a node (X) from every neighbour node, error of AOA estimate, estimated orientation of node (X), error of orientation estimate, estimated position, and error of position estimate.

19. At least one computer program product ($102_1$, ..., $102_n$) directly loadable into the internal memory of at least one digital computer ($100_1$, ..., $100_n$), comprising software code portions for performing the steps of claim 10 when said at least one product ($102_1$, ..., $102_n$) is/are run on said at least one computer ($100_1$, ..., $100_n$).

* * * * *